United States Patent
Kagaya et al.

(10) Patent No.: US 11,500,807 B2
(45) Date of Patent: Nov. 15, 2022

(54) CIRCUIT APPARATUS IN WHICH A PROCESSING CIRCUIT TRANSFERS A FULL SPEED TRANSFER PACKET BETWEEN PHYSICAL LAYER CIRCUITS, AND AN ELECTRONIC INSTRUMENT AND VEHICLE INCLUDING THE CIRCUIT APPARATUS

(71) Applicant: SEIKO EPSON CORPORATION, Tokyo (JP)

(72) Inventors: Ryuichi Kagaya, Chino (JP); Yoshiyuki Kamihara, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/404,183

(22) Filed: Aug. 17, 2021

(65) Prior Publication Data
US 2022/0058149 A1    Feb. 24, 2022

(30) Foreign Application Priority Data
Aug. 19, 2020    (JP) .............................. JP2020-138542

(51) Int. Cl.
*G06F 13/40* (2006.01)
*G06F 11/30* (2006.01)
*B60R 16/023* (2006.01)

(52) U.S. Cl.
CPC ........ *G06F 13/4022* (2013.01); *B60R 16/023* (2013.01); *G06F 11/3027* (2013.01); *G06F 13/4072* (2013.01); *G06F 2213/0042* (2013.01)

(58) Field of Classification Search
CPC ............. G06F 13/4022; G06F 11/3027; G06F 13/4072; B60R 16/023
See application file for complete search history.

(56) References Cited

U.S. PATENT DOCUMENTS 9,348,781 B2 *   5/2016  Chan ..................... G06F 1/3209
10,802,566 B1 *  10/2020  Lam ...................... G06F 1/3296
(Continued)

FOREIGN PATENT DOCUMENTS

JP         2018-121200         8/2018

OTHER PUBLICATIONS

Intel, "USB 2.0 Transceiver Macrocell Interface (UTMI) Specification", Mar. 29, 2001, version 1.05 (Year: 2001).*

*Primary Examiner* — Phong H Dang
(74) *Attorney, Agent, or Firm* — Rankin, Hill & Clark LLP

(57) ABSTRACT

A circuit apparatus includes physical layer circuits to which buses compliant with the USB standard are coupled, a processing circuit that performs an FS transfer process, a bus monitoring circuit that monitors the buses, and a bus switching circuit that turns on or off the coupling between a first bus and a second bus based on the result of the monitoring. One of the physical layer circuits includes an FS receiver, an FS driver, and a pull-up control circuit, and the other physical layer circuits includes an FS receiver and an FS driver. When FS_J is detected on the second bus, the bus monitoring circuit turns off the coupling achieved by the bus switching circuit, turns on the pull-up operation performed by the pull-up control circuit, and turns on the FS transfer process performed by the processing circuit.

9 Claims, 11 Drawing Sheets

(56) References Cited

U.S. PATENT DOCUMENTS

| | | | |
|---|---|---|---|
| 2003/0212841 A1* | 11/2003 | Lin | G06F 13/4081 |
| | | | 710/62 |
| 2006/0047881 A1* | 3/2006 | Turner | G06F 13/426 |
| | | | 710/313 |
| 2010/0049880 A1* | 2/2010 | Santhanam | G06F 13/4081 |
| | | | 710/15 |
| 2017/0010997 A1* | 1/2017 | Lin | G06F 1/3287 |
| 2017/0277249 A1* | 9/2017 | Low | G06F 13/4282 |
| 2018/0212796 A1* | 7/2018 | Kamihara | G01R 31/007 |

* cited by examiner

CIRCUIT APPARATUS IN WHICH A PROCESSING CIRCUIT TRANSFERS A FULL SPEED TRANSFER PACKET BETWEEN PHYSICAL LAYER CIRCUITS, AND AN ELECTRONIC INSTRUMENT AND VEHICLE INCLUDING THE CIRCUIT APPARATUS

The present application is based on, and claims priority from JP Application Serial Number 2020-138542, filed Aug. 19, 2002, the disclosure of which is hereby incorporated by reference herein in its entirety.

BACKGROUND

1. Technical Field

The present invention relates to a circuit apparatus, an electronic instrument, and a vehicle.

2. Related Art

JP-A-2018-121200 discloses a circuit apparatus of related art capable of reducing the degree of deterioration of USB (universal serial bus) signal characteristics. The circuit apparatus of the related art includes a bus monitoring circuit that monitors the state of a USB signal in a first bus to which one of a host and a device in a USB configuration is coupled and in a second bus to which the other one of the host and the device is coupled, a bus switching circuit that is turned on at a predetermined timing and transmits a USB signal in a mode other than the HS mode, and a processing circuit that transmits and receives a USB packet in the HS mode.

The circuit apparatus of the related art is intended to reduce the degree of deterioration of the characteristics of a USB signal in the HS communication. To this end, the signal path via the bus switch is switched to the signal path via the processing circuit in the HS connection to perform resynchronization and amplitude adjustment on an HS packet received from one of the first and second buses, and the resultant HS packet is outputted to the other bus. In the FS communication and other types of communication used in a low-speed USB device, however, an FS USB signal is caused to propagate along the signal path via the bus switching circuit, so that no signal characteristic improvement is performed, and the internal resistance and other factors of the bus switching circuit could instead affect the signal characteristics.

SUMMARY

An aspect of the present disclosure relates to a circuit apparatus including a first physical layer circuit to which a first bus compliant with a USB standard is coupled, a second physical layer circuit to which a second bus compliant with the USB standard is coupled, a processing circuit that performs an FS transfer process of transferring an FS packet received from the first bus via the first physical layer circuit to the second bus via the second physical layer circuit and transferring the FS packet received from the second bus via the second physical layer circuit to the first bus via the first physical layer circuit in an FS mode, a bus monitoring circuit that monitors the first bus and the second bus, and a bus switching circuit that turns on or off coupling between the first bus and the second bus based on a result of the monitoring performed by the bus monitoring circuit. The first physical layer circuit includes a first FS receiver that is a receiving circuit that operates in the FS mode in the first bus, a first FS driver that is a transmitting circuit that operates in the FS mode in the first bus, and a first pull-up control circuit that pulls up the first bus. The second physical layer circuit includes a second FS receiver that is a receiving circuit that operates in the FS mode in the second bus and a second FS driver that is a transmitting circuit that operates in the FS mode in the second bus. When FS_J is detected on the second bus, the bus monitoring circuit turns off the coupling between the first bus and the second bus achieved by the bus switching circuit, turns on the pull-up operation performed by the first pull-up control circuit, and turns on the FS transfer process performed by the processing circuit.

Another aspect of the present disclosure relates to an electronic instrument including the circuit apparatus described above.

Another aspect of the present disclosure relates to a vehicle including the circuit apparatus described above.

DESCRIPTION OF EXEMPLARY EMBODIMENTS

An embodiment of the present disclosure will be described below. It is not intended that the present embodiment described below unduly limits the contents set forth in the appended claims. Further, all configurations described in the present embodiment are not necessarily essential configuration requirements of the present disclosure.

1. Circuit Apparatus

Figure 1:
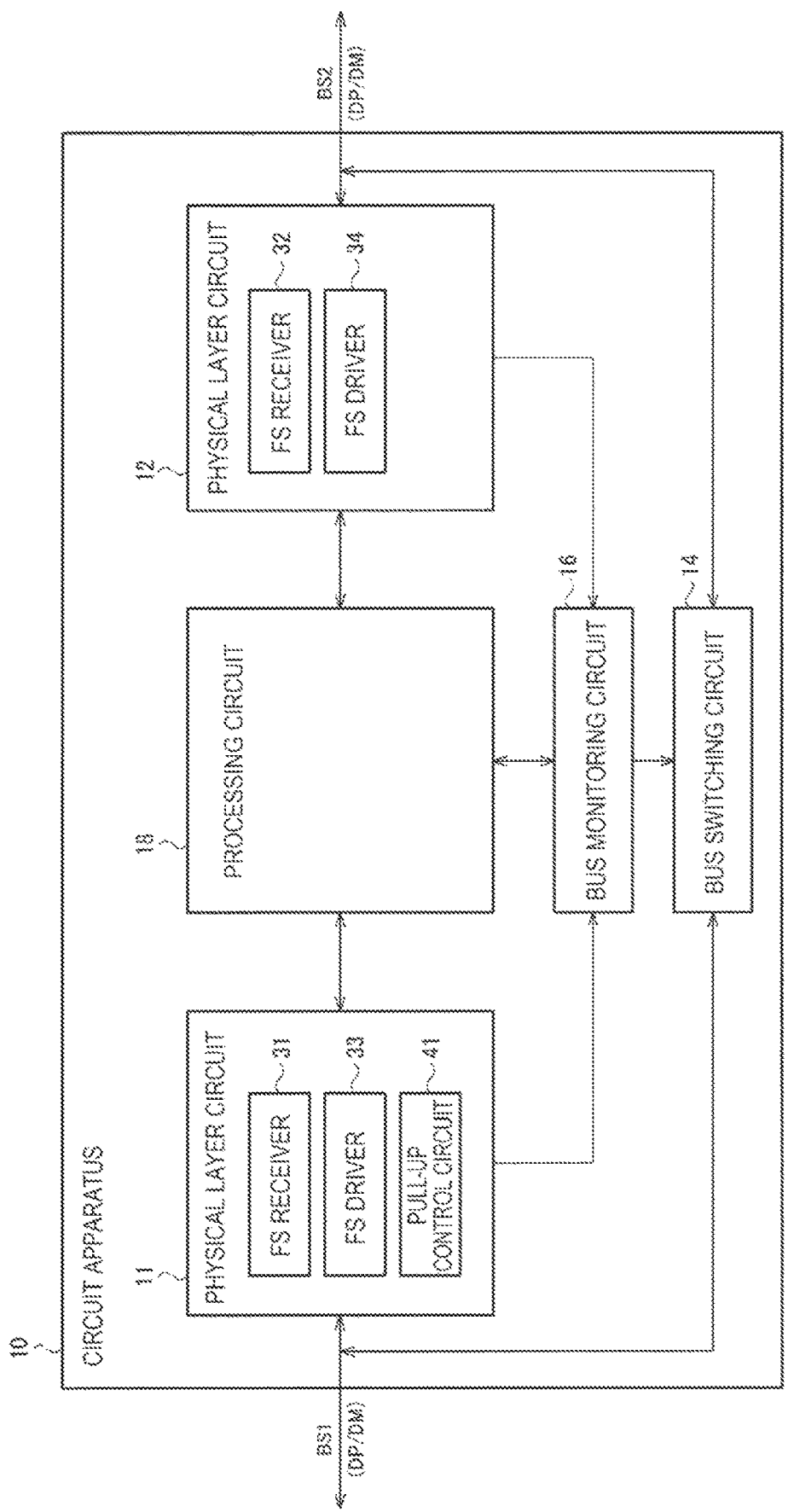
FIG. 1 shows an example of the configuration of a circuit apparatus according to an embodiment of the present disclosure.

FIG. 1 shows an example of the configuration of a circuit apparatus 10 according to the present embodiment. The circuit apparatus 10 includes physical layer circuits 11 and 12, a bus switching circuit 14, a bus monitoring circuit 16, and a processing circuit 18. The physical layer circuit 11 is, for example, a first physical layer circuit, and the physical layer circuit 12 is, for example, a second physical layer circuit.

A bus BS1, which complies with the USB standard, is coupled to the physical layer circuit 11. A bus BS2, which complies with the USB standard, is coupled to the physical layer circuit 12. The bus BS1 is, for example, a first bus, and bus BS2 is, for example, a second bus. The physical layer circuits 11 and 12 are each formed of a physical-layer analog circuit. The physical-layer analog circuit is, for example, a transmitting circuit, a receiving circuit, a variety of detection circuits, or a pull-up resistor circuit. Examples of the processing circuit 18 include a serial/parallel conversion circuit that converts serial data received via a USB configuration into parallel data, a parallel/serial conversion circuit that converts parallel data into serial data, an elastic buffer, and a circuit corresponding a link layer, such as an NRZI circuit. For example, a circuit corresponding, for example, to a link layer in a USB transceiver macrocell is an example of the processing circuit 18, and a transmitting circuit, a receiving circuit, a detection circuit, and other analog circuits are examples of the physical layer circuits 11 and 12.

The bus BS1 is, for example, a bus to which a host is coupled, and the bus BS2 is, for example, a bus to which a device is coupled. The present embodiment is, however, not limited to the coupling aspect described above and can also handle a coupling aspect in which a device is coupled to the bus BS1 and a host is coupled to the bus BS2. The buses BS1 and BS2 are USB standard buses including the signal lines for signals DP and DM, which are first and second signals that form differential signals. The buses BS1 and BS2 can include signal lines for a power supply VBUS and the ground GND. The USB standard is, in a broad sense, a standard for given data transfer. The following description will be made primarily of the case where a host is coupled to the bus BS1 and a device is coupled to the bus BS2 for simplification of the description.

The bus switching circuit 14 has one end coupled to the bus BS1 and the other end coupled to the bus BS2. The bus switching circuit 14 turns on or off the coupling between the bus BS1 and the bus BS2. That is, the bus switching circuit 14 electrically couples or decouples the bus BS1 and the bus BS2 to or from each other. Turning on or off the coupling between the bus BS1 and the bus BS2 means, for example, turning on or off switch elements or any other components provided between the DP and DM signal lines of the bus BS1 and the DP and DM signal lines of the bus BS2. The coupling between circuits and the coupling between a bus or a signal line and a circuit in the present embodiment are each electrical coupling. The electrical coupling is coupling that allows transmission of an electric signal and transmission of information in the form of an electric signal. The electrical coupling may be coupling, for example, via a signal line or an active element.

Specifically, the bus switching circuit 14 turns on the coupling between the bus BS1 and the bus BS2 for a first period. That is, the bus switching circuit 14 includes a switch element provided between the bus BS1 and the bus BS2, and the switch element is turned on for the first period. A host or any other component coupled to the bus BS1 can thus directly transfer a USB signal via a USB bus to a device or any other component coupled to the bus BS2 and vice versa. For example, a first switch element for the signal DP and a second switch element for the signal DM are provided as the switch element. The host is, for example, a host controller or a main controller, and the device is, for example, a peripheral device. The bus switching circuit 14 turns off the coupling between the bus BS1 and the bus BS2 for a second period. That is, the switch element provided between the bus BS1 and the bus BS2 is turned off for the second period. The processing circuit 18 performs a predetermined transfer process in the second period.

The bus monitoring circuit 16 monitors the bus BS1 and the bus BS2. Specifically, the bus monitoring circuit 16 monitors the state of the USB signal. For example, the bus monitoring circuit 16 monitors the state of the USB buses by monitoring the voltage levels or any other factor of the DP and DM signal lines. Specifically, the bus monitoring circuit 16 monitors the buses BS1 and BS2 by using the physical layer circuits 11 and 12. That is, the bus monitoring circuit 16 performs monitoring operation of monitoring the buses BS1 and BS2 based on a signal from the physical layer circuit 11 and a signal from the physical layer circuit 12. The bus switching circuit 14 then turns on or off the coupling between the bus BS1 and the bus BS2 based on the result of the monitoring performed by the bus monitoring circuit 16. For example, the bus switching circuit 14 turns on the coupling between the bus BS1 and the bus BS2 for the first period and turns off the coupling for the second period based on the result of the monitoring performed by the bus monitoring circuit 16. The processing circuit 18 then performs a predetermined transfer process in the second period.

The processing circuit 18 is a circuit that performs the transfer process and a variety of control processes and can be achieved, for example, by a logic circuit achieved by automatically arranged wiring lines, such as agate array. The processing circuit 18 may instead be formed of a processor, such as a CPU and an MPU.

The processing circuit 18 performs an FS (full speed) transfer process. For example, in the FS mode, the processing circuit 18 performs the FS transfer process of transferring an FS packet received from the bus BS1 via the physical layer circuit 11 to the bus BS2 via the physical layer circuit 12 and transferring an FS packet received from the bus BS2 via the physical layer circuit 12 to the bus BS1 via the physical layer circuit 11. For example, the processing circuit 18 performs the FS transfer process in the off state of the bus switching circuit 14. That is, the processing circuit 18 performs the FS transfer process in the second period. For example, the processing circuit 18 performs the FS transfer process in at least part of the second period. The processing circuit 18 further performs an LS (low speed) transfer process. For example, in the LS mode, the processing circuit 18 performs the LS transfer process of transferring an LS packet received from the bus BS1 via the physical layer circuit 11 to the bus BS2 via the physical layer circuit 12 and transferring an LS packet received from the bus BS2 via the physical layer circuit 12 to the bus BS1 via the physical layer circuit 11. The FS transfer process and the LS transfer process will be described later in detail.

The processing circuit 18 can further perform an HS (high speed) transfer process. For example, the processing circuit 18 performs the HS transfer process of transmitting an HS packet received from the bus BS1 via the physical layer circuit 11 to the bus BS2 via the physical layer circuit 12 and transmitting an HS packet received from the bus BS2 via the physical layer circuit 12 to the bus BS1 via the physical layer circuit 11 during the off state of the bus switching circuit 14. For example, the processing circuit 18 transfers an HS packet from the side facing the bus BS1 to the side facing the bus BS2 or from the bus BS2 side to the bus BS1 side without changing the packet format. At this point, the processing circuit 18 performs predetermined signal processing in the HS transfer process. The predetermined signal processing is signal processing for packet transfer, specifically, signal processing for transferring a repeat packet of a received HS packet. For example, the processing circuit 18 resynchronizes the bits of the HS packet as the predetermined signal processing. For example, when an HS packet is received, the processing circuit 18 samples each bit of the HS packet based on the clock signal generated by the circuit apparatus 10. When an HS packet is transmitted, the processing circuit 18 transmits each bit of the HS packet in synchronization with the clock signal generated by the circuit apparatus 10. When an HS packet is transferred along a transfer path via the processing circuit 18, the processing circuit 18 performs the resynchronization, which is the predetermined signal processing, to achieve high-quality signal transfer in the HS communication with the degree of deterioration of the signal characteristics of the USB transmission signal reduced.

In the present embodiment, the physical layer circuit 11 includes an FS receiver 31, an FS driver 33, and a pull-up control circuit 41, as shown in FIG. 1. The FS receiver 31 is a first FS receiver, specifically, an receiving circuit that operates in the FS mode in the bus BS1. The FS driver 33 is a first FS driver, specifically, a transmitting circuit that operates in the FS mode in the bus BS1. The pull-up control circuit 41 is a first pull-up control circuit and pulls up the bus BS1. For example, the pull-up control circuit 41 pulls up the DP signal line and the DM signal line of the bus BS1. For example, the pull-up control circuit 41 includes a pull-up resistor having one end coupled to a high-potential power supply node and a pull-up switching circuit having one end coupled to the other end of the pull-up resistor and the other end coupled to a USB signal line. When the pull-up switching circuit is turned on, the pull-up control circuit 41 pulls up the USB signal line, which is the DP signal line or the DM signal line of the bus BS1.

The physical layer circuit 12 includes an FS receiver 32 and an FS driver 34. The FS receiver 32 is a second FS receiver, specifically, a receiving circuit that operates in the FS mode in the bus BS2. The FS driver 34 is a second FS driver, specifically, a transmitting circuit that operates in the FS mode in the bus BS2.

When FS_J is detected on the bus BS2, the bus monitoring circuit 16 turns off the coupling between the bus BS1 and the bus BS2 achieved by the bus switching circuit 14. That is, when FS_J provided by an FS device coupled to the bus BS2 is detected, the bus monitoring circuit 16 turns off the coupling between the bus BS1 and the bus BS2. The bus monitoring circuit 16 then turns on the operation of pulling up the DP signal line performed by the pull-up control circuit 41 and turns on the FS transfer process performed by the processing circuit 18. When the pull-up control circuit 41 pulls up the bus BS1 to DP, a host coupled to the bus BS1 can be notified that a device is coupled to the bus BS2. Thereafter, when the coupling between the bus BS1 and the bus BS2 is turned off so that the FS transfer process is turned on, the FS transfer process of transferring an FS packet received from the bus BS1 to the bus BS2 and transferring an FS packet received from the bus BS2 to the bus BS1 can be performed. That is, the FS packet transfer process between the host coupled to the bus BS1 and the FS device coupled to the bus BS2 can be performed.

When the pull-up operation performed by the pull-up control circuit 41 is turned on and FS_K on the bus BS1 or the bus BS2 is then detected, the bus monitoring circuit 16 turns on the FS transfer process performed by the processing circuit 18. For example, when the pull-up operation is turned on and FS_K provided by the host coupled to the bus BS1 or the device coupled to the bus BS2 is then detected, the bus monitoring circuit 16 turns on the FS transfer process to enable the host or the device to transmit the FS packet. That is, the processing circuit 18 performs the FS transfer process of transferring an FS packet received from the bus BS1 to the bus BS2 or transferring an FS packet received from the bus BS2 to the bus BS1.

When a USB cable is attached and FS_J is then detected on the bus BS2, the bus monitoring circuit 16 turns off the coupling between the bus BS1 and the bus BS2 achieved by the bus switching circuit 14 and turns on the pull-up operation performed by the pull-up control circuit 41. That is, when an USB cable is attached and FS_J is then detected, the bus monitoring circuit 16 determines that device coupling has been detected and turns on the operation of pulling up the bus BS1 performed by the pull-up control circuit 41. When SE0 is detected on the bus BS1, the bus monitoring circuit 16 turns on the coupling between the bus BS1 and the bus BS2 achieved by the bus switching circuit 14 and turns off the pull-up operation performed by the pull-up control circuit 41. That is, when detection of the device coupling causes the host coupled to the bus BS1 to achieve SE0 on the bus BS1, the bus monitoring circuit 16 determines that a bus reset is detected, turns on the coupling between the bus BS1 and the bus BS2, and turns off the pull-up operation performed by the pull-up control circuit 41.

When transition to the FS idle state is detected, the bus monitoring circuit 16 turns off the FS transfer process performed by the processing circuit 18 with the coupling between the bus BS1 and the bus BS2 achieved by the bus switching circuit 14 kept off and the pull-up operation kept on. For example, when the transition to the FS idle state is detected after communication of the FS packet, the bus monitoring circuit 16 turns off the FS transfer process performed by the processing circuit 18 with the coupling between the bus BS1 and the bus BS2 kept off and the pull-up operation performed by the pull-up control circuit 41 kept on.

In the LS mode, the processing circuit 18 performs the LS transfer process of transferring an LS packet received from the bus BS1 via the physical layer circuit 11 to the bus BS2 via the physical layer circuit 12 and transferring an LS packet received from the bus BS2 via the physical layer circuit 12 to the bus BS1 via the physical layer circuit 11, as described above. In the LS mode, when LS_J is detected on the bus BS2, the bus monitoring circuit 16 turns off the coupling between the bus BS1 and the bus BS2 achieved by the bus switching circuit 14. That is, when LS_J provided by an LS device coupled to the bus BS2 is detected, the bus monitoring circuit 16 turns off the coupling between the bus BS1 and the bus BS2. The bus monitoring circuit 16 then turns on the operation of pulling up the DM signal line performed by the pull-up control circuit 41 and turns on the LS transfer process performed by the processing circuit 18. The LS packet transfer process between the host coupled to the bus BS1 and the LS device coupled to the bus BS2 can thus be performed.

Figure 2:
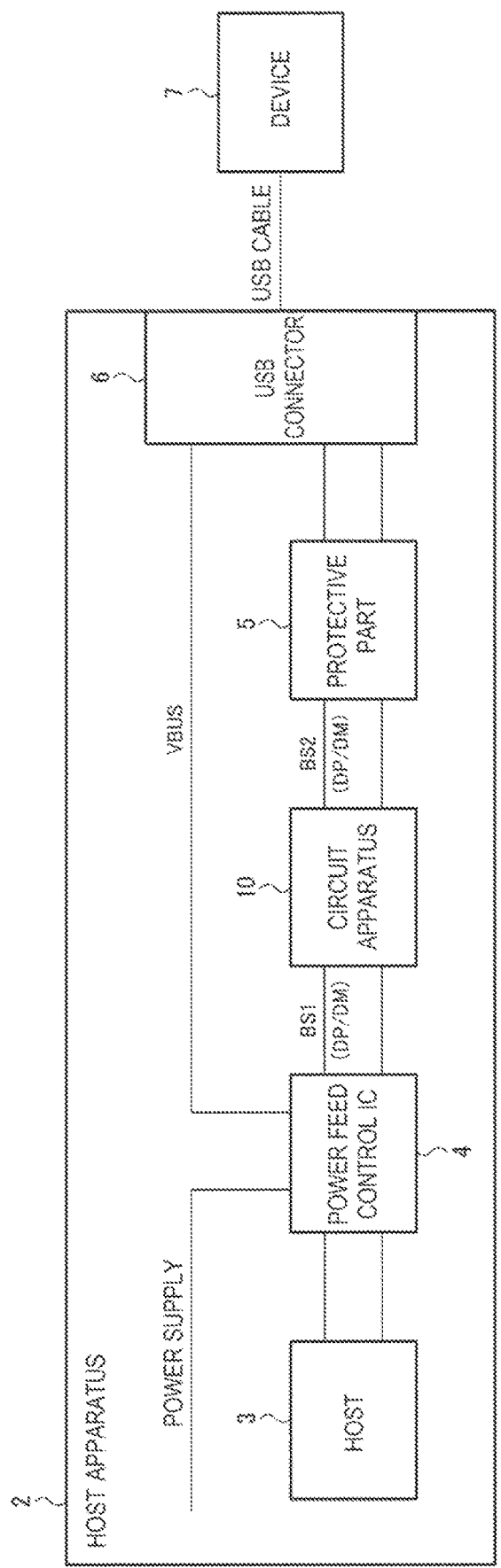
FIG. 2 shows an example of the configuration of a host instrument including the circuit apparatus.

FIG. 2 shows an example of the configuration of a host apparatus 2 including the circuit apparatus 10 according to the present embodiment. The host apparatus 2 includes, for example, a host 3, a power feed control IC 4, the circuit apparatus 10, a protective part 5, and a USB connector 6. The host 3 is, for example, a main controller, and is achieved, for example, by an SOC (system-on-a-chip). The power feed control IC 4, when electric power is supplied thereto, performs power feed control in compliance, for example, with the BC protocol. Electric power that allows large current to flow can thus be supplied as VBUS to a device 7. The protective part 5 is, for example, an electrostatic protection element. The USB connector 6 is, for example, a USB receptacle, and one end of a USB cable is coupled to the USB connector 6. The device 7 coupled to the other end of the USB cable is a peripheral device, such as a smartphone.

The bus BS1 from the circuit apparatus 10 is coupled to the host 3 via the power feed control IC4, and the bus BS2 from the circuit apparatus 10 is coupled to the device 7 via the protective part 5, the USB connector 6, and the USB cable, as shown in FIG. 2. As described above, the buses BS1 and BS2 do not need to be directly coupled to the host 3 and the device 7 and may be coupled thereto, for example, via a circuit element or a cable. In FIG. 2, the bus BS1 is coupled to the host 3, and the bus BS2 is coupled to the device 7. Instead, the circuit apparatus 10 according to the present embodiment can handle a coupling aspect in which the device 7 is coupled to the bus BS1 and the host 3 is coupled to the bus BS2, as described above.

In the present embodiment, in which the circuit apparatus 10 is provided between the host 3 and the device 7 as shown in FIG. 2, the communication quality in the USB signal transfer can be improved. For example, an eye pattern waveform can be improved also in the measurement of an USB eye pattern. Further, in the present embodiment, the circuit apparatus 10 can be provided, for example, in the path of the USB cable. For example, a cable harness, which is an example of electronic instruments, may be provided with the circuit apparatus 10. For example, when a long USB cable is used, providing the cable harness of the USB cable with the circuit apparatus 10 allows suppression of deterioration of the USB signal quality and improvement in the eye pattern waveform. However, when the circuit apparatuses 10 are coupled in series at multiple points as described above, parasitic resistance produced by the internal resistance in the bus switching circuit 14 also undesirably increases. As a result, for example, the signal quality of an FS or LS USB signal deteriorates, and the FS or LS eye pattern waveform cannot undesirably be improved.

Figure 3:
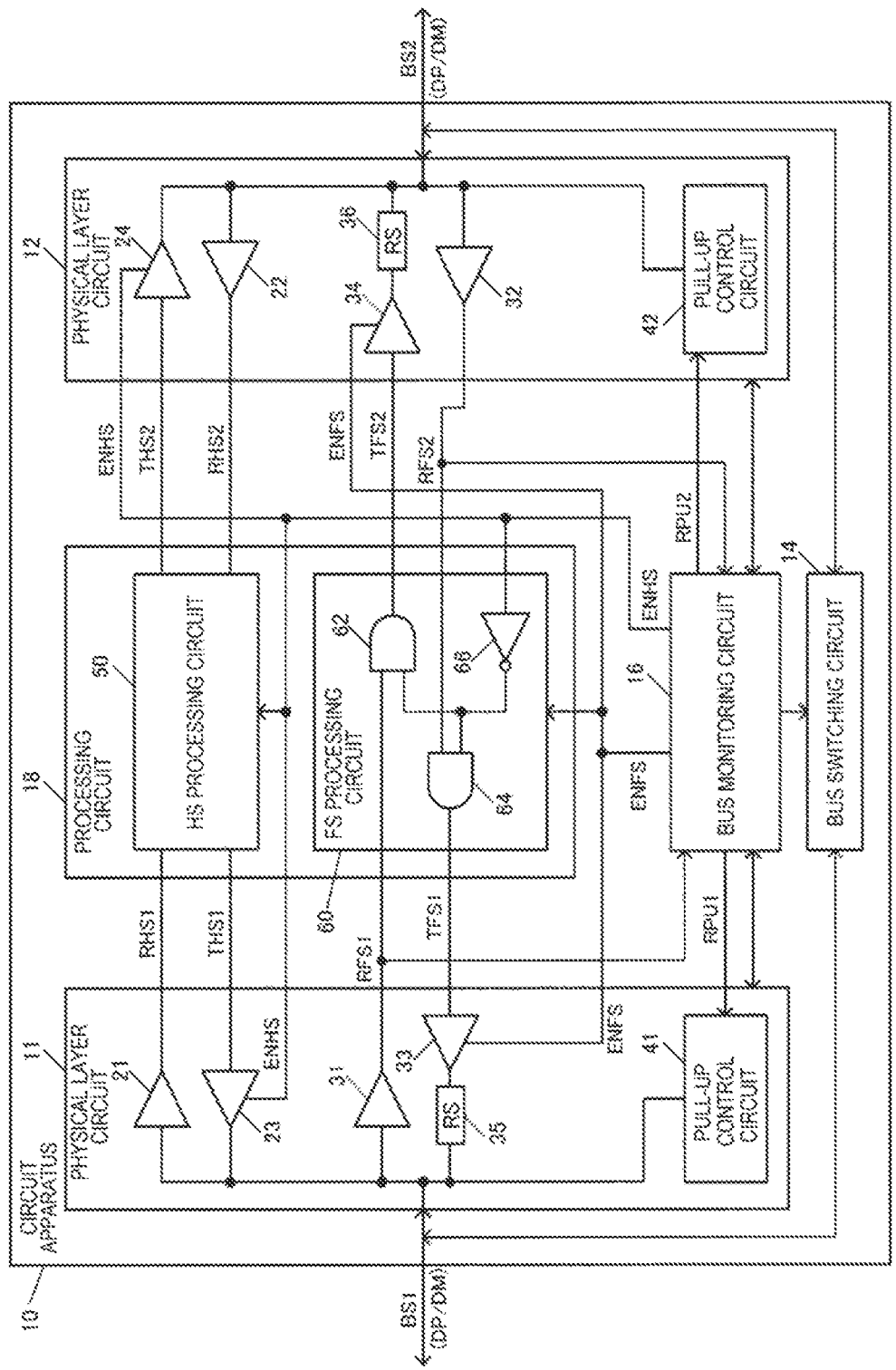
FIG. 3 shows an example of a detailed configuration of the circuit apparatus according to the present embodiment.

FIG. 3 shows an example of a detailed configuration of the circuit apparatus 10 according to the present embodiment. In the present embodiment, the processing circuit 18 includes an HS processing circuit 50 and an FS processing circuit 60, as shown in FIG. 3. For example, the circuit apparatus of the related art described above is provided only with the HS processing circuit 50, which performs the HS transfer process, whereas the circuit apparatus 10 according to the present embodiment is also provided with the FS processing circuit 60, which performs the FS transfer process. The FS processing circuit 60 can also perform the LS transfer process.

The physical layer circuit 11 includes an HS receiver 21, an HS driver 23, the FS receiver 31, the FS driver 33, and the pull-up control circuit 41. The HS receiver 21 is a differential input receiving circuit to which the DP and DM signals on the bus BS1 are inputted. The HS driver 23 includes a current source and outputs current transmitted from the current source to the DP and DM signal lines of the bus BS1. The HS receiver 31 is a differential input receiving circuit to which the DP and DM signals on the bus BS1 are inputted. The FS receiver 31 can include a DP single-ended input receiver to which the DP signal on the bus BS1 is inputted and a DM single-ended input receiver to which the DM signal on the bus BS1 is inputted. The FS driver 33 is a differential output transmission circuit that drives the DP and DM signal lines of the bus BS1. A terminating resistor 35 is provided at the output of the FS driver 33. Specifically, a 45-Ω terminating resistor 35 is provided at each of a first output node and a second output node of the FS driver 33. The FS receiver 31 also serves as an LS receiver, and the FS driver 33 also serves as an LS driver. The pull-up control circuit 41 includes a pull-up resistor, and the bus monitoring circuit 16 selects any of the following states: a state in which the DP signal line of the bus BS1 is pulled up; the DM signal line of the bus BS1 is pulled up; and an off state in which no pulling up is performed.

The physical layer circuit 12 includes an HS receiver 22, an HS driver 24, the FS receiver 32, the FS driver 34, and a pull-up control circuit 42. The HS receiver 22 is a differential input receiving circuit to which the DP and DM signals on the bus BS2 are inputted. The HS driver 24 includes a current source and outputs current transmitted from the current source to the DP and DM signal lines on the bus BS2. The FS receiver 32 is a differential input receiving circuit to which the DP and DM signals on the bus BS2 are inputted. The FS receiver 32 can include a DP single-ended input receiver to which the DP signal on the bus BS2 is inputted and a DM single-ended input receiver to which the DM signal on the bus BS2 is inputted. The FS driver 34 is a differential output transmission circuit that drives the DP and DM signal lines of the bus BS2. A terminating resistor 36 is provided at the output of the FS driver 34. Specifically, a 45-Ω terminating resistor 36 is provided at each of a first output node and a second output node of the FS driver 34. The FS receiver 32 also serves as an LS receiver, and the FS driver 34 also serves as an LS driver. The pull-up control circuit 42 includes a pull-up resistor, and the bus monitoring circuit 16 selects any of the following states: a state in which the DP signal line of the bus BS2 is pulled up; the DM signal line of the bus BS2 is pulled up; and an off state in which no pulling up is performed.

An HS signal on the bus BS1 is received by the HS receiver 21 and inputted as an HS received signal RHS1 to the HS processing circuit 50. Thereafter, the HS received signal RHS1 is resynchronized by the HS processing circuit 50, inputted as an HS transmitted signal THS2 to the HS driver 24, and outputted by the HS driver 24 to the bus BS2. The HS signal on the bus BS1 is thus resynchronized and adjusted in terms of amplitude and can be outputted to the bus BS2. Similarly, an HS signal on the bus BS2 is received by the HS receiver 22 and inputted as an HS received signal RHS2 to the HS processing circuit 50. Thereafter, the HS received signal RHS2 is resynchronized by the HS processing circuit 50, inputted as an HS transmitted signal THS1 to the HS driver 23, and outputted by the HS driver 23 to the bus BS1. The HS signal on the bus BS2 is thus resynchronized and adjusted in terms of amplitude and can be outputted to the bus BS1.

An FS signal on the bus BS1 is received by the FS receiver 31 and inputted as an FS received signal RFS1 to the FS processing circuit 60 and the bus monitoring circuit 16. The FS received signal RFS1 is then buffered by the FS processing circuit 60, inputted as an FS transmitted signal TFS2 to the FS driver 34, and outputted by the FS driver 34 to the bus BS2. Similarly, an FS signal on the bus BS2 is received by the FS receiver 32 and inputted as an FS received signal RFS2 to the FS processing circuit 60 and the bus monitoring circuit 16. The FS received signal RFS2 is then buffered by the FS processing circuit 60, inputted as an FS transmitted signal TFS1 to the FS driver 33, and outputted by the FS driver 33 to the bus BS1.

The bus monitoring circuit 16 receives as an input the FS received signal RFS1 from the FS receiver 31 and monitors the bus BS1 based on the FS received signal RFS1. For example, a DP single-ended input receiver and a DM single-ended input receiver may be provided as the FS receiver 31, and the bus monitoring circuit 16 may use the output signals from the receivers as the FS received signal RFS1 to monitor the bus BS1. The bus monitoring circuit 16 receives as an input the FS received signal RFS2 from the FS receiver 32 and monitors the bus BS2 based on the FS received signal RFS2. For example, a DP single-ended input receiver and a DM single-ended input receiver may be provided as the FS receiver 32, and the bus monitoring circuit 16 may use the output signals from the receivers as the FS received signal RFS2 to monitor the bus BS2.

The bus monitoring circuit 16 controls the bus switching circuit 14 to cause it to turn on or off the coupling between the bus BS1 and the bus BS2 based on the results of the monitoring of the buses BS1 and BS2. Further, the bus monitoring circuit 16 outputs pull-up control signals RPU1 and RPU2 to the pull-up control circuits 41 and 42 based on the results of the monitoring of the buses BS1 and BS2 to control the operation of pulling up the bus BS1 and the operation of pulling up the bus BS2. The bus monitoring circuit 16 further outputs an HS transfer enable signal ENHS to the HS processing circuit 50 based on the results of the monitoring of the buses BS1 and BS2 to control the HS processing circuit 50 to cause it to turn on or off the HS transfer process. The bus monitoring circuit 16 outputs the enable signal ENHS also to the FS processing circuit 60. The bus monitoring circuit 16 further outputs an FS transfer enable signal ENFS to the FS processing circuit 60 based on the results of the monitoring of the buses BS1 and BS2 to control the FS processing circuit 60 to cause it to turn on or off the FS transfer process. The bus monitoring circuit 16 outputs the FS transfer enable signal ENFS also to the FS drivers 33 and 34.

The FS processing circuit 60 includes a buffer circuit 62 and a buffer circuit 64. The FS processing circuit 60 can further include an inverter circuit 66. The buffer circuit 62 is a first buffer circuit, and the buffer circuit 64 is a second buffer circuit. The buffer circuit 62 buffers the FS received signal RFS1 from the FS receiver 31 and outputs the buffered FS received signal RFS1 as the FS transmitted signal TFS2 to the FS driver 34. The buffer circuit 64 buffers the FS received signal RFS2 from the FS receiver 32 and outputs the buffered FS received signal RFS2 as the FS transmitted signal TFS1 to the FS driver 33. The FS processing circuit 60 formed of the buffer circuits 62 and 64 can buffer the FS signal from the bus BS1 and output the buffered FS signal to the bus BS2 or buffer the FS signal from the bus BS2 and output the buffered FS signal to the bus BS1. Specifically, the buffer circuit 62 is formed, for example, of an AND circuit. The FS received signal RFS1 is inputted to the first input terminal of the AND circuit, and a signal resulting from inversion of the HS transfer enable signal ENHS performed by the inverter circuit 66 is inputted to the second input terminal of the AND circuit. The buffer circuit 64 is also formed, for example, of an AND circuit. The FS received signal RFS2 is inputted to the first input terminal of the AND circuit, and a signal resulting from inversion of the HS transfer enable signal ENHS performed by the inverter circuit 66 is inputted to the second input terminal of the AND circuit. In the configuration described above, when the HS transfer enable signal ENHS has a high level, which is an active level, the HS transfer process performed by the HS processing circuit 50 is turned on, the output signals from the buffer circuits 62 and 64 is fixed at a low level.

The FS processing circuit 60 is selected as an FS transfer or LS transfer signal path by the bus monitoring circuit 16. For example, in the FS mode, the FS processing circuit 60 buffers and sends an FS packet received from the bus BS1 to the side facing the bus BS2 and an FS packet received from the bus BS2 to the side facing the bus BS1. In the LS mode, the FS processing circuit 60 buffers and sends an LS packet received from the bus BS1 to the side facing the bus BS2 and an LS packet received from the bus BS2 to the side facing the bus BS1.

In the HS communication, in which the HS transfer enable signal ENHS has the high level, the FS transmitted signals TFS1 and TFS2 outputted by the FS processing circuit 60 are fixed at the low level. The FS drivers 33 and 34, to which the FS transmitted signals TFS1 and TFS2 are inputted, thus output low level signals, so that the terminating resistors 35 and 36 are enabled in the HS communication.

The bus monitoring circuit 16 selects the bus switching circuit 14 as a signal path used when the processing circuit 18 performs a non-transfer process and a signal path in a suspended/resumed state of the processing circuit 18. The bus switching circuit 14 causes the signal received from the bus BS1 to propagate directly to the side facing the bus BS2 and the signal received from the bus BS2 to propagate directly to the side facing the bus BS1.

Figure 4:
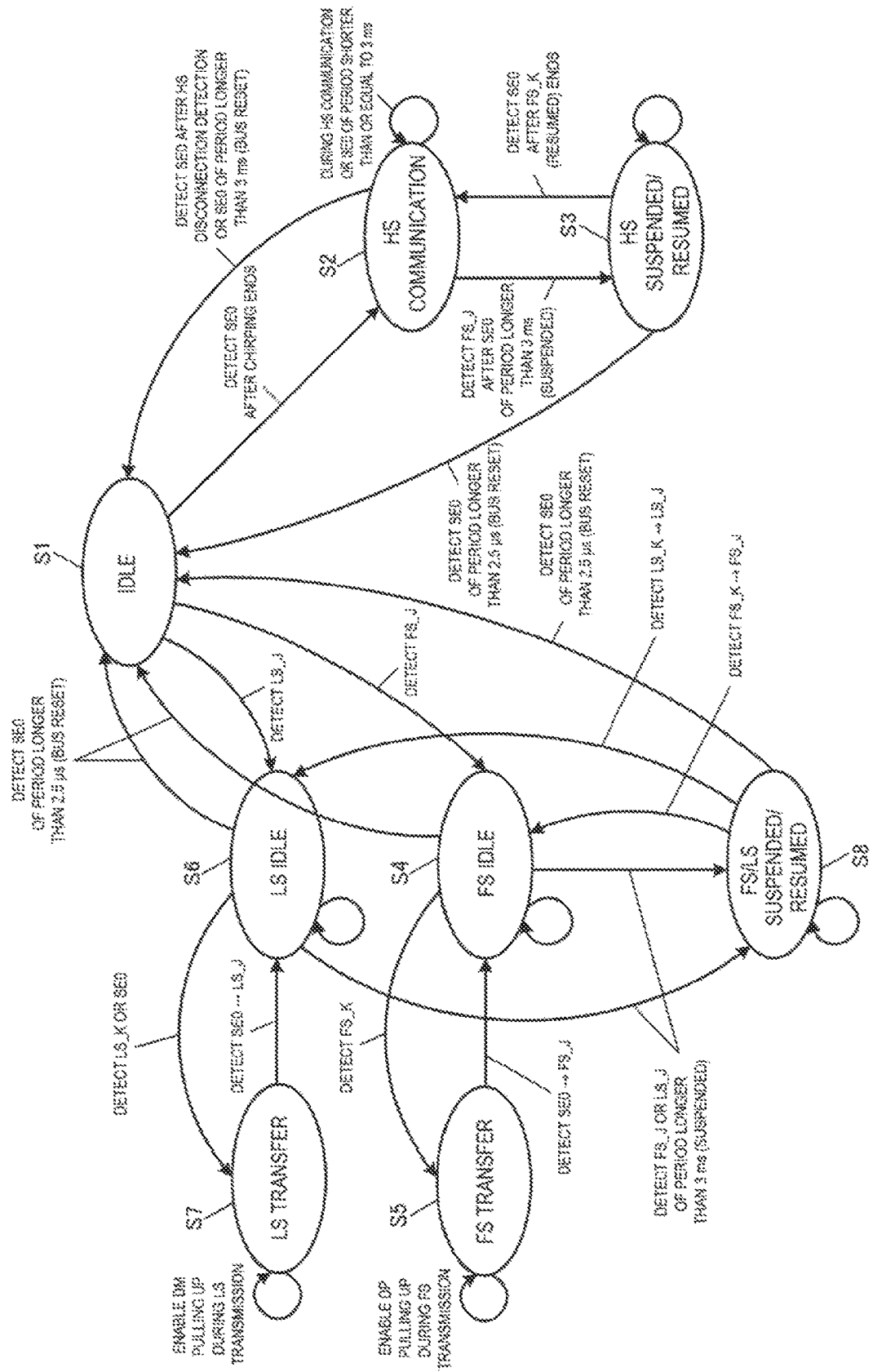
FIG. 4 is a state transition diagram for describing the operation in the present embodiment.

FIG. 4 is a state transition diagram of the circuit apparatus 10 according to the present embodiment. When SE0 is detected after the end of the chirping, the circuit apparatus 10 transitions from an idle state S1 to an HS communication state S2. When a predetermined condition is satisfied, the circuit apparatus 10 transitions from the HS communication state S2 to a suspended/resumed state S3 or returns from the suspended/resumed state S3 to the HS communication state S2. When the bus reset is detected in the HS communication state S2 or the suspended/resumed state S3, the circuit apparatus 10 returns to the idle state S1.

When FS_J is detected in the idle state S1, the circuit apparatus 10 transitions to an FS idle state S4, and the operation of pulling up the DP signal line is enabled. When FS_K is detected, the circuit apparatus 10 transitions from the FS idle state S4 to an FS transfer state S5, and the FS transfer process is enabled. When FS_J is detected after SE0, the circuit apparatus 10 returns to the FS idle state S4. When LS_J is detected in the idle state S1, the circuit apparatus 10 transitions to an LS idle state S6, and the operation of pulling up the DM signal line is enabled. When LS_K or SE0 is detected, the circuit apparatus 10 transitions from the LS idle state S6 to an LS transfer state S7, and the LS transfer process is enabled. When LS_J is detected after SE0, the circuit apparatus 10 returns to the LS idle state S6. When a predetermined condition is satisfied, the circuit apparatus 10 transitions from the FS idle state S4 or the LS idle state S6 to a suspended/resumed state S8 or returns from the state S8 to the state S4 or S6. When the bus reset is detected in the FS idle state S4, the LS idle state S6, or the suspended/resumed state S8, the circuit apparatus 10 returns to the idle state S1.

2. Operation in Present Embodiment 2.1 Operation at the Time of HS Connection

Figure 5:
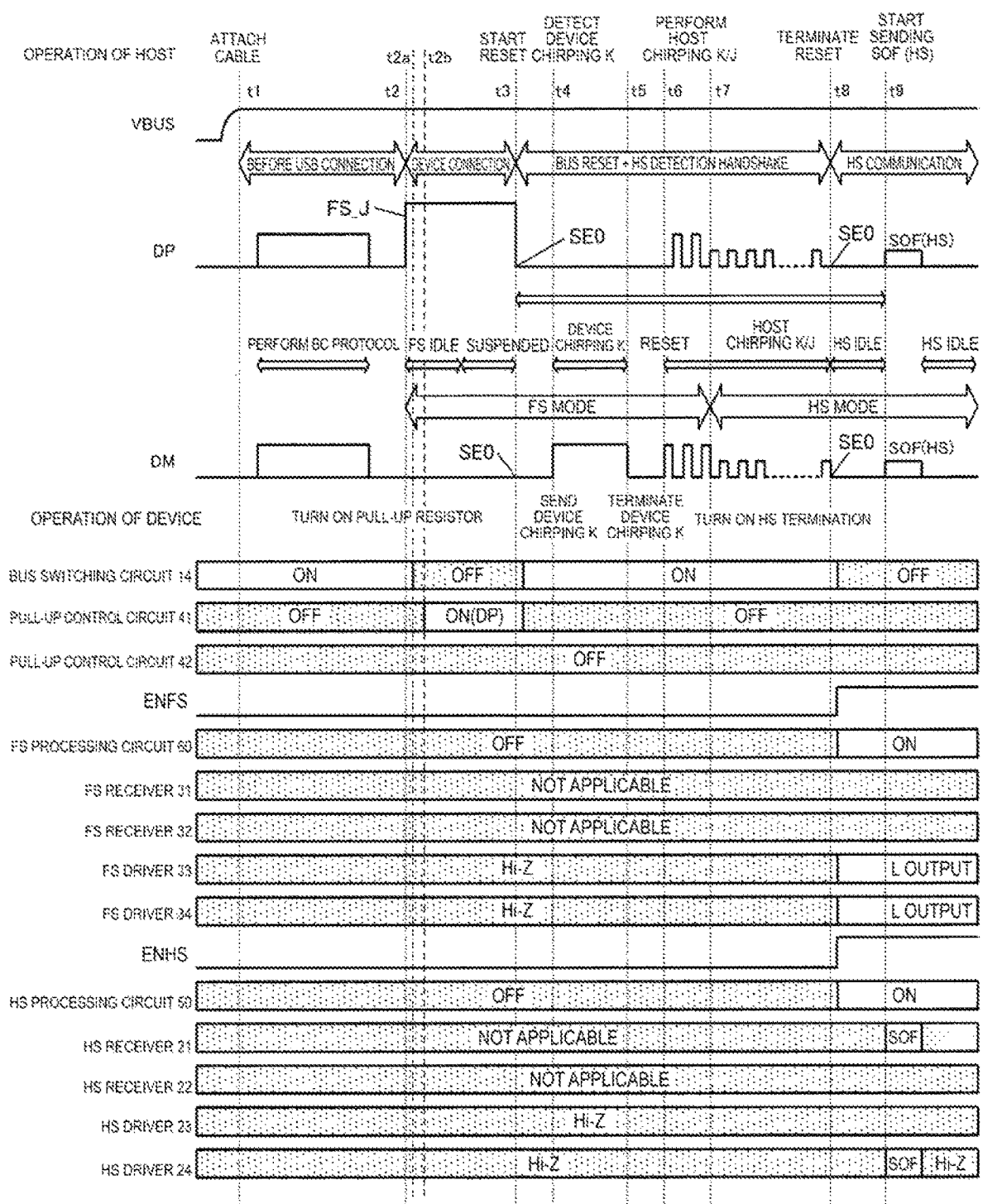
FIG. 5 is a timing waveform diagram for describing the operation in the present embodiment at the time of HS connection.
Figure 6:
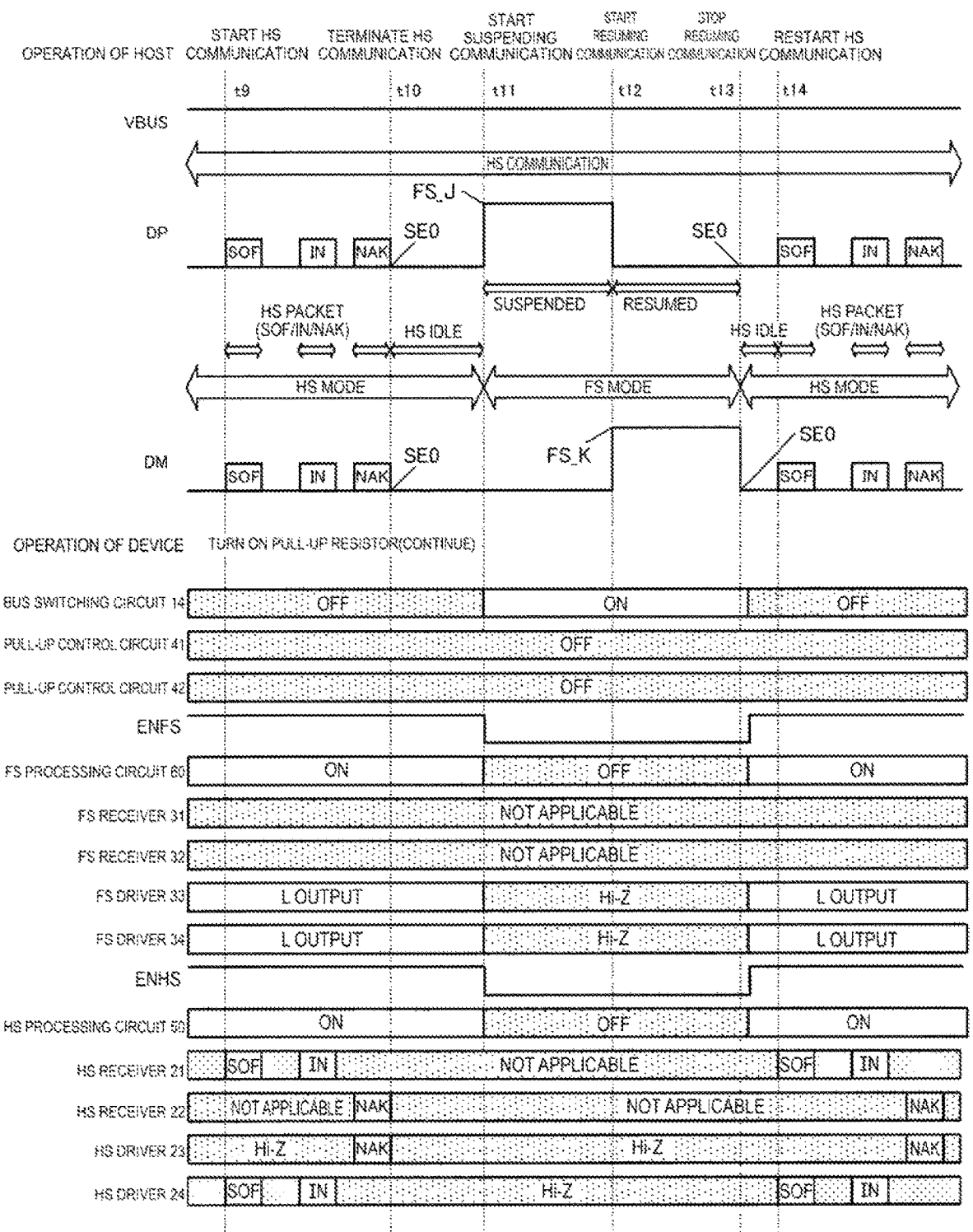
FIG. 6 is a timing waveform diagram for describing the operation in the present embodiment at the time of HS connection.

The operation in the present embodiment will next be described in detail. FIGS. 5 and 6 are timing waveform diagrams for describing the operation in the present embodiment at the time of HS connection. That is, FIGS. 5 and 6 are timing waveform diagrams when an HS-supporting device is coupled.

Typical operation performed when an HS-supporting device is coupled will first be described. After a cable to which the host and the device are coupled is attached (timing t1) but before the USB coupling is made, the power feed control ICs of the host and the device settle electric power supplied from the host to the device based on the BC protocol, which is a proprietary protocol.

The device turns on a 1.5-kΩ pull-up resistor to notify the coupling to the host to achieve FS_J, which achieves a state in which the USB DP signal line is set at 3.3 V to cause the hose to transition to the FS idle (timing t2). The host determines that the device has been coupled by detecting the state described above.

To start communication with the coupled device, the host turns on the terminating resistor to set the USB DP and DM signal lines at 0 V (SE0) to start the bus reset (timing t3). The device detects the state described above and determines that the host has recognized the device coupling.

To notify the host that the device supports HS, the device couples the current source to the DM signal line to achieve a state in which the DM signal line is set at 800 mV and sends device chirping K (timing t4). The host detects the state described above and determines that the coupled device supports HS.

To start HS connection with the device, the host alternately couples the current source to the DP signal line and the DM signal line to achieve a state in which the DP and DM signal lines are alternately set at 800 mV and sends host chirping K/J (FS) (timing t6). The device detects the state described above and determines that the host has recognized that the device supports HS.

To notify the host that the device can perform HS communication, the device turns on the terminating resistor to achieve a state in which the high-potential-side voltage level of the DP and DM signal lines is set at 400 mV, and host chirping K/J (HS) is presented (timing t7). The host detects the state described above and determines that the coupled device can perform HS communication.

To start the HS communication with the device, the host terminates the host chirping K/J (HS) to set the DP and DM signal lines at 0V (SE0) to terminate the bus reset (timing t8). The host thereafter performs the HS communication with the device by sending a variety of HS packets including SOF to the device.

The detailed operation in the present embodiment at the time of the HS connection will next be specifically described with reference to the timing waveform diagrams of FIGS. 5 and 6. The description will be made of a case where an HS-supporting host is coupled to the bus BS1 and an HS-supporting device is coupled to the bus BS2. In the following description, turning on and off the coupling between the bus BS1 and the bus BS2 achieved by the bus switching circuit 14 is simply called as appropriate turning on and off the bus switching circuit 14. Further, turning on and off the pull-up operation performed by the pull-up control circuits 41 and 42 is simply called as appropriate turning on and off the pull-up control circuits 41 and 42. Further, the operation of pulling up the DP signal line and the DM signal line is simply called as appropriate DP pulling up and DM pulling up.

(1) In a state in which the device coupled to the bus BS2 has turned off the DP pulling up, the bus monitoring circuit 16 turns on the bus switching circuit 14 to keep the host-device signal path via the bus switching circuit 14 (to timing t2).

(2) When the device coupled to the bus BS2 turns on the DP pulling up to present the coupling state, and when the bus monitoring circuit 16 detects FS_J (FS idle) resulting from the DP pulling up (timing t2), the bus monitoring circuit 16 turns off the bus switching circuit 14 to close the host-device signal path (timing t2*a*). The host is therefore not notified of FS_J (FS idle), and the device coupling state is not detected.

(3) When the host-to-device signal path is closed, the bus monitoring circuit 16 checks whether FS_J resulting from the DP pulling up is detected by the FS receiver 31 on the side facing the bus BS1 or the FS receiver 32 on the side facing the bus BS2. In this example, since the device is coupled to the bus BS2, the FS receiver 32 on the side facing the bus BS2 detects FS_J.

(4) After identifying the FS receiver having detected FS_J resulting from the DP pulling up, the bus monitoring circuit 16 turns on the pull-up control circuit in the opposite bus from the bus where FS_J has been detected to enable the DP pulling up. In this example, since FS_J has been detected on the side facing the bus BS2, the bus monitoring circuit 16 turns on the pull-up control circuit 41 on the side facing the bus BS1 to enable the DP pulling up on the bus BS1 (timing t2*b*). FS_J (FS idle) resulting from the DP pulling up is thus presented to the host coupled to the bus BS1, so that the host is notified of the device coupling state.

(5) Upon detection of the device coupling state, the host performs the bus reset (timing t3). When the bus monitoring circuit 16 detects SE0 resulting from the bus reset, the bus monitoring circuit 16 turns on the bus switching circuit 14 and turns off the pull-up control circuit 41.

(6) The device presents the device chirping K to notify the host that the device supports HS. The bus monitoring circuit 16 leaves the bus switching circuit 14 on and keeps the signal path passing through the bus switching circuit 14, so that the host-device signal directly passes through the signal path, and HS detection handshake is performed. Further, the bus monitoring circuit 16 detects the transition of the HS detection handshake (timings t4 to t8).

(7) When the host-device HS detection handshake is completed, the host terminates the chirping. When the bus monitoring circuit 16 detects SE0 (timing t8), the bus monitoring circuit 16 turns off the bus switching circuit 14 and turns on the FS processing circuit 60 and the HS processing circuit 50. Turning on the FS processing circuit 60 to cause the FS driver 33 to output the low level signal enables the terminating resistor 35, whereby HS communication can be performed.

(8) Thereafter, the HS processing circuit 50 relays HS packets exchanged between the host and the device to perform HS communication (from timing t9).

(9) FIG. 6 is a signal waveform diagram at the time of transition from the HS communication to the suspended/resumed state. When the HS communication is terminated (timing t10) and the period for which no HS packet is transmitted or received exceeds 3 ms, the host and the device transition to the suspended state with the bus kept idle. At this point, when the bus monitoring circuit 16 detects FS_J after SE0 of the period longer than 3 ms, it is determined that the current state is transitioning to the suspended state and the bus switching circuit 14 is turned on so that the signal path is switched to the signal path passing through the bus switching circuit 14 (timing t11). A suspending/resuming signal thus passes through the bus switching circuit 14.

(10) When it is notified in the suspended state that FS_K is provided (timing t12), the host and device return from the suspended state. At this point, when the bus monitoring circuit 16 detects the change from FS_K to SEC) (timing t13), it is determined that the suspended state has returned to the current state and the bus switching circuit 14 is turned off so that the signal path is switched to the signal path passing through the HS processing circuit 50 to prepare for transmission and receipt of HS packets again (from timing t14).

2.2 Operation at the Time of FS Connection

Figure 7:
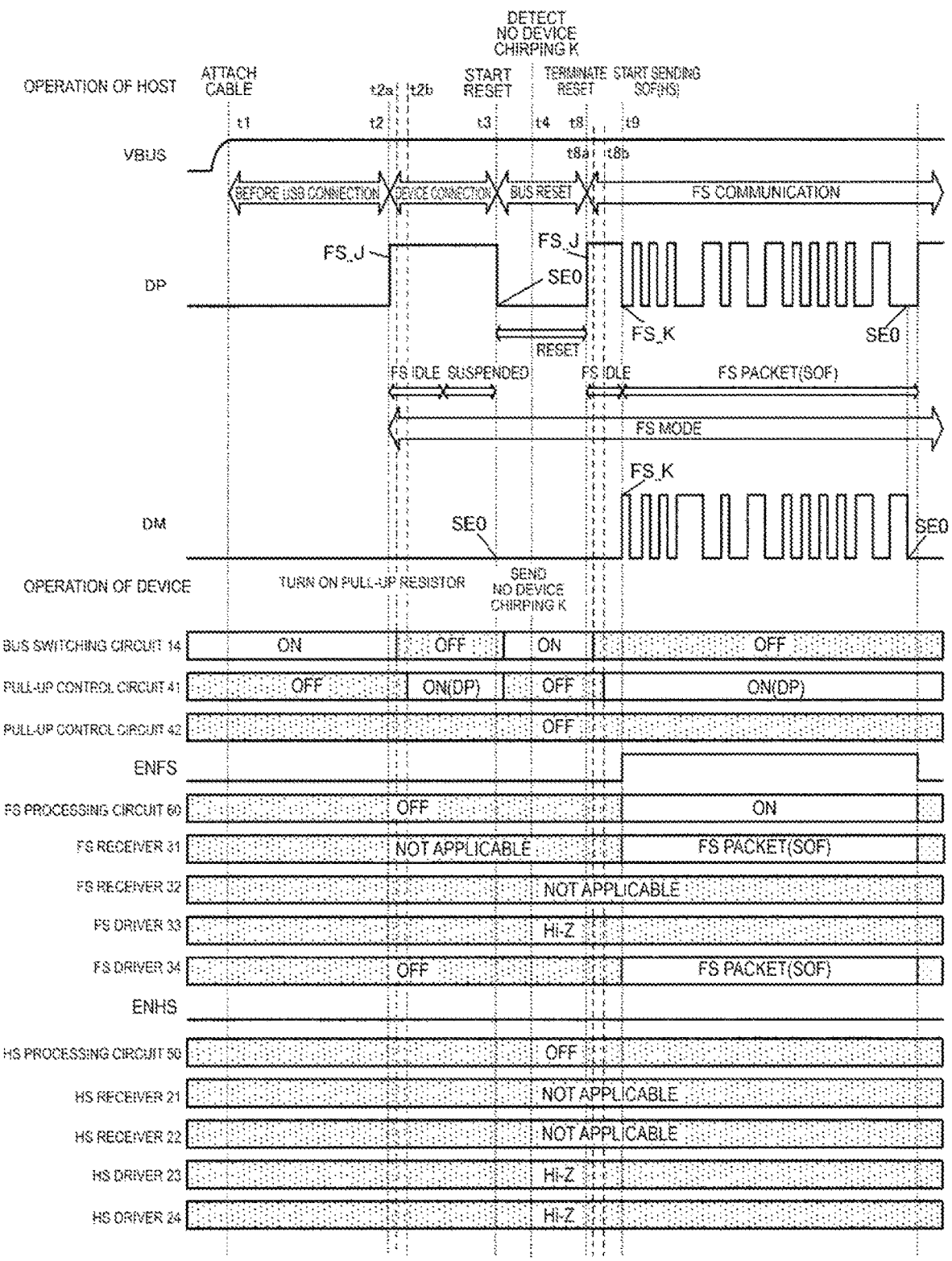
FIG. 7 is a timing waveform diagram for describing the operation in the present embodiment at the time of FS connection.

The detailed operation in the present embodiment at the time of FS connection will next be described in detail with reference to the timing waveform diagrams of FIGS. 7 and 8. The description will be made of a case where an HS-supporting host is coupled to the bus BS1 and a non-HS-supporting FS device is coupled to the bus BS2. Note that the operation at the time of the following FS connection (1) to (5) is the same as the operations at the time of the HS connection (1) to (5) described above.

(1) In the state in which the device coupled to the bus BS2 has turned off the DP pulling up, the bus monitoring circuit 16 turns on the bus switching circuit 14 to keep the host-device signal path via the bus switching circuit 14 (to timing t2).

(2) When the device coupled to the bus BS2 turns on the DP pulling up to present the coupling state, and when the bus monitoring circuit 16 detects FS_J (FS idle) resulting from the DP pulling up (timing t2), the bus monitoring circuit 16 turns off the bus switching circuit 14 to close the host-device signal path (timing t2a). The host is therefore not notified of FS_J (FS idle), and the device coupling state is not detected.

(3) When the host-to-device signal path is closed, the bus monitoring circuit 16 checks whether FS_J resulting from the DP pulling up is detected by the FS receiver 31 on the side facing the bus BS1 or the FS receiver 32 on the side facing the bus BS2. In this example, since the device is coupled to the bus BS2, the FS receiver 32 on the side facing the bus BS2 detects FS_J.

(4) After identifying the FS receiver having detected FS_J resulting from the DP pulling up, the bus monitoring circuit 16 turns on the pull-up control circuit in the opposite bus from the bus where FS_J has been detected to enable the DP pulling up. In this example, since FS_J has been detected on the side facing the bus BS2, the bus monitoring circuit 16 turns on the pull-up control circuit 41 on the side facing the bus BS1 to enable the DP pulling up on the bus BS1 (timing t2b). FS_J (FS idle) resulting from the DP pulling up is thus presented to the host coupled to the bus BS1, so that the host is notified of the device coupling state.

(5) Upon detection of the device coupling state, the host performs the bus reset (timing t3). When the bus monitoring circuit 16 detects SE0 resulting from the bus reset, the bus monitoring circuit 16 turns on the bus switching circuit 14 and turns off the pull-up control circuit 41.

Since a non-HS-supporting device presents no device chirping K, the host cannot perform the HS detection handshake. Therefore, since SE0 continues in the state described above, the bus monitoring circuit 16 leaves the bus switching circuit 14 on and keeps the signal path passing through the bus switching circuit 14 (timing t4).

When the host cancels the bus reset, FS_J resulting from DP pulling up performed by the device is presented again (timing t8). When the bus monitoring circuit 16 detects FS_J (FS idle) resulting from the DP pulling up, as in (2) described above, the bus monitoring circuit 16 turns off the bus switching circuit 14 to close the host-device signal path to block the propagation of FS_J (FS idle) to the host (timing t8a).

(8) When the host-device signal path is closed, the bus monitoring circuit 16 determines whether the FS receiver on the side facing the bus BS1 or the FS receiver on the side facing the BS2 detects FS_J resulting from the DP pulling up, as in (3) described above.

(9) After identifying the FS receiver having detected FS_J resulting from the DP pulling up, the bus monitoring circuit 16 turns on the pull-up control circuit 41 on the side facing the bus BS1, which is the opposite bus from the bus where FS_J has been detected, as in (4) described above, to enable the DP pulling up on the bus BS1 (timing t8b). FS_J (FS idle) resulting from the DP pulling up is thus presented to the host coupled to the bus BS1, and the idle state of the device is notified to the host.

(10) When the idle state of the device is detected, transmission and receipt of FS packets are performed between the host and the device. Since an FS packet starts with FS_K and ends with SE0, the bus monitoring circuit 16 turns on the FS processing circuit 60 between the FS_K and SE0 to cause the FS driver 33 or the FS driver 34 to drive the received FS packet to transmit the FS packet to the bus on the opposite side (from timing t9). After the transfer of the FS packet is completed, the bus monitoring circuit 16 turns off the FS processing circuit 60 and waits in the idle state again.

Figure 8:
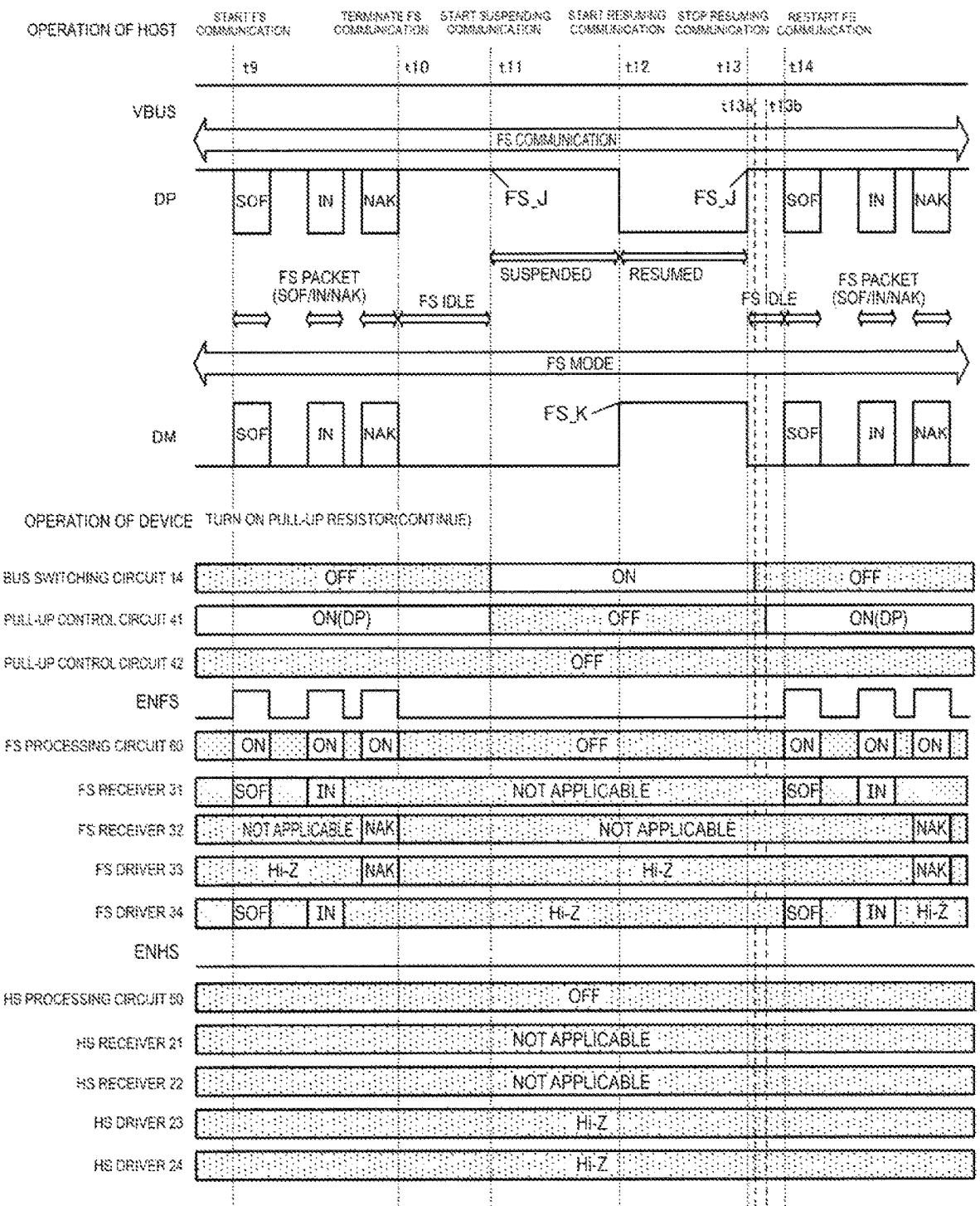
FIG. 8 is a timing waveform diagram for describing the operation in the present embodiment at the time of FS connection.

(11) FIG. 8 is a signal waveform diagram at the time of transition from the FS communication to the suspended/resumed state. When the FS communication is terminated (timing t10) and the period for which no HS packet is transmitted or received exceeds 3 ms, the host and the device transition to the suspended state with the bus kept idle. At this point, the bus monitoring circuit 16 measures the period of the FS idle state, which corresponds to FS_J, and when the period of the FS idle state exceeds 3 ms, it is determined that the current state is transitioning to the suspended state, and the bus switching circuit 14 is turned off so that the signal path is switched to the signal path passing through the bus switching circuit 14 and the pull-up control circuit 41 is turned off (timing t11).

(12) When it is notified in the suspended state that FS_K is provided, the host and the device return from the suspended state. At this point, when the bus monitoring circuit 16 detects the change from FS_K to FS_J (timing t13), it is determined that the suspended state has returned to the current state, and the bus switching circuit 14 is turned off so that the signal path is switched to the signal path passing through the FS processing circuit 60 and the pull-up control circuit 41 is turned on (timing t13b) to prepare for transmission and receipt of FS packets again (from timing t14).

2.3 Operation at the Time of LS Connection

Figure 9:
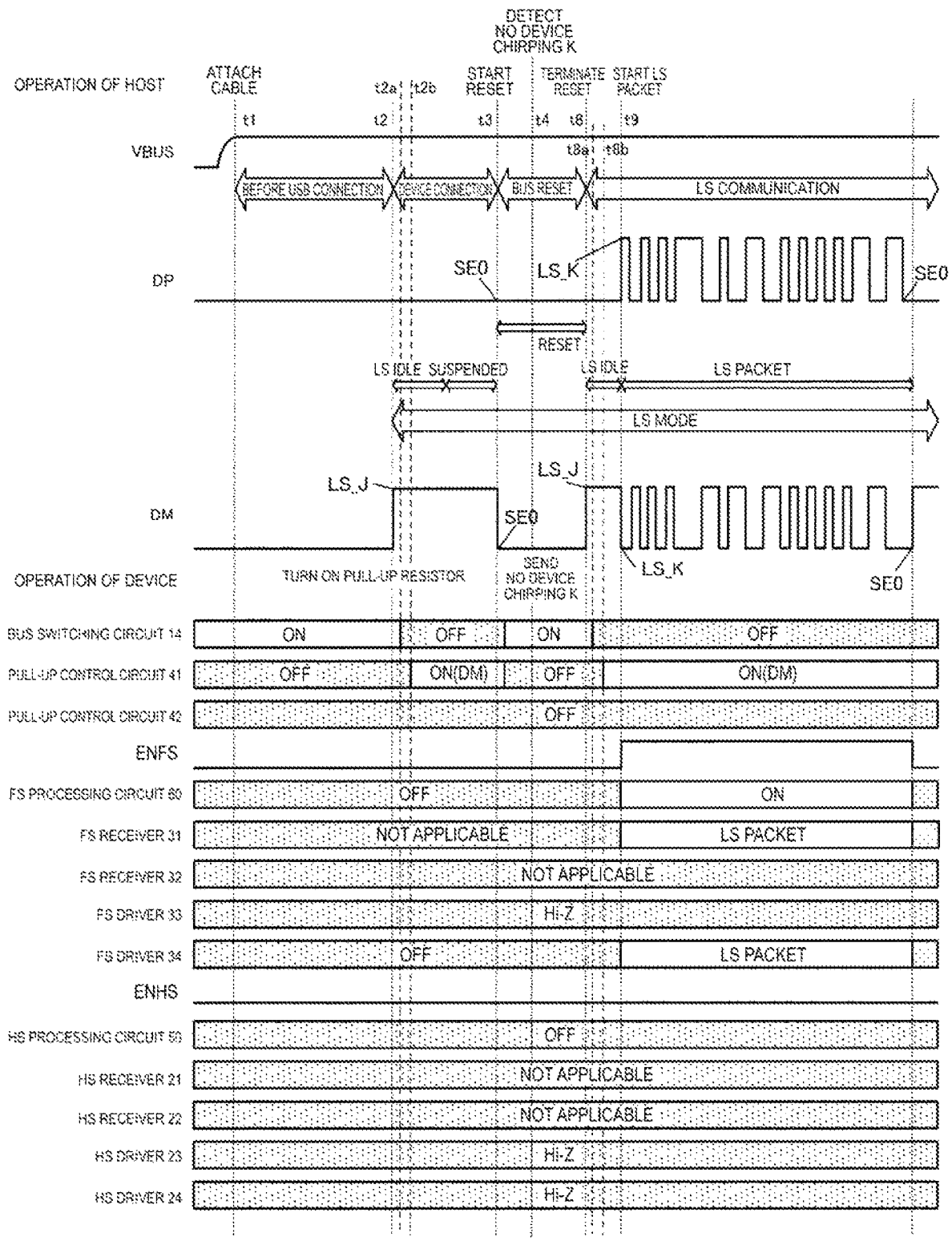
FIG. 9 is a timing waveform diagram for describing the operation in the present embodiment at the time of LS connection.

The detailed operation in the present embodiment at the time of LS connection will next be described with reference to the timing waveform diagrams of FIGS. 9 and 10. The description will be made of a case where an HS-supporting host is coupled to the bus BS1 and an LS-supporting device is coupled to the bus BS2.

(1) In a state in which the device coupled to the bus BS2 has turned off the DM pulling up, the bus monitoring circuit 16 turns on the bus switching circuit 14 to keep the host-device signal path (to timing t2).

(2) When the device coupled to the bus BS2 turns on the DM pulling up to present the coupling state, and when the bus monitoring circuit 16 detects LS_J (LS idle) resulting from the DM pulling up (timing t2), the bus monitoring circuit 16 turns off the bus switching circuit 14 to close the host-device signal path (timing t2a). The host is therefore not notified of the LS_J (LS idle), and the coupling state of the device is not detected.

(3) When the host-to-device signal path is closed, the bus monitoring circuit 16 checks whether LS_J resulting from the DM pulling up is detected by the FS receiver 31 on the bus BS1 side or the FS receiver 32 on the bus BS2 side. In this example, since the device is coupled to the bus BS2, the FS receiver 32 on the side facing the bus BS2 detects LS_J.

(4) After identifying the FS receiver having detected LS_J resulting from the DM pulling up, the bus monitoring circuit 16 turns on the pull-up control circuit of the opposite bus from the bus where the LS_J has been detected to enable the DM pulling up. In this example, since LS_J has been detected on the side facing the bus BS2, the pull-up control circuit 41 on the side facing the bus BS1 is turned on to enable the DM pulling up on the side fating the bus BS1 (timing t2b). LS_J (LS idle) resulting from the DM pulling up is thus presented to the host coupled to the bus BS1, and the coupling state of the device is notified to the host.

(5) When the host detects the coupling state of the device, the host performs the bus reset (timing t3). When the bus monitoring circuit 16 detects SEC) resulting from the bus reset, the bus monitoring circuit 16 turns on the bus switching circuit 14 and turns off the pull-up control circuit 41.

(6) Since the LS device does not support HS, the host cannot perform the HS detection handshake. Therefore, since SEC) continues in the state described above, the bus monitoring circuit 16 leaves the bus switching circuit 14 on and keeps the signal path passing through the bus switching circuit 14 (timing t4).

(7) When the host cancels the bus reset, LS_J resulting from the DM pulling up performed by the device is presented again (timing t8). When the bus monitoring circuit 16 detects LS_J (LS idle) resulting from the DM pulling up as in (2) described above, the bus monitoring circuit 16 turns off the bus switching circuit 14 to close the host-device signal path to block the propagation of LS_J (LS idle) to the host (timing t8a).

(8) When the host-device signal path is closed, the bus monitoring circuit 16 checks whether the FS receiver on the side facing the bus BS1 or the side facing the bus BS2 detects LS_J resulting from the DM pulling up, as in (3) described above.

(9) After identifying the FS receiver having detected LS_J resulting from the DM pulling up, the bus monitoring circuit 16 turns on the pull-up control circuit 41 on opposite bus from the bus where LS_J has been detected to enable the DM pulling up on the side facing the bus BS1 (timing t8b), as in (4) described above. LS_J (LS idle) resulting from the DM pulling up is thus presented to the host coupled to the bus BS1, and the idle state of the device is notified to the host.

(10) When the idle state of the device is detected, transmission and receipt of LS packets are performed between the host and the device. Since an LS packet starts with LS_K and ends with SE0, the bus monitoring circuit 16 turns on the FS processing circuit 60 between LS_K and SE0 to cause the FS driver 33 or the FS driver 34 to drive the received LS packet to transmit the LS packet to the bus on the opposite side (from timing t9). After the transfer of the FS packet is completed, the bus monitoring circuit 16 turns off the FS processing circuit 60 and waits in the idle state again.

Figure 10:
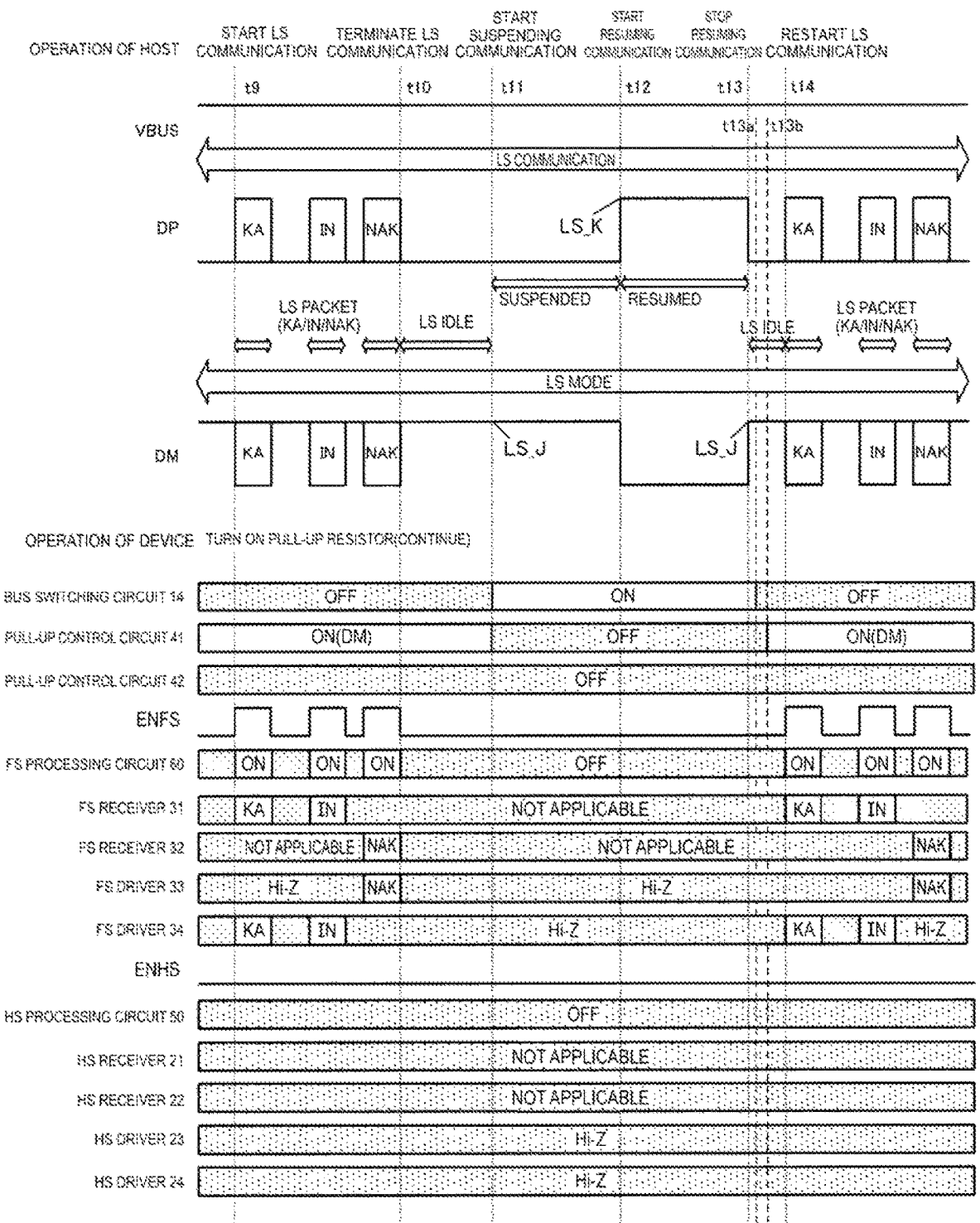
FIG. 10 is a timing waveform diagram for describing the operation in the present embodiment at the time of LS connection.

(11) FIG. 10 is a signal waveform diagram at the time of transition from the LS communication to the suspended/resumed state. When the LS communication is terminated (timing t10) and the period for which no LS packet is transmitted or received exceeds 3 ms, the host and the device transition to the suspended state with the bus kept idle. At this point, the bus monitoring circuit 16 measures the period of the LS idle state, which corresponds to LS_J, and when the period of the LS idle state exceeds 3 ms, it is determined that the current state is transitioning to the suspended state, and the bus switching circuit 14 is turned on so that the signal path is switched to the signal path passing through the bus switching circuit 14 and the pull-up control circuit 41 is turned off (timing t11).

(12) When it is notified in the suspended state that LS_K is provided, the host and the device return from the suspended state. At this point, when the bus monitoring circuit 16 detects the change from LS_K to LS_J (timing t13), the bus monitoring circuit 16 turns off the bus switching circuit 14 (timing t13a) to switch the signal path to the signal path passing through the FS processing circuit 60 and turns on the pull-up control circuit 41 to prepare for transmission and receipt of LS packets again (from timing t14).

As described above, in the present embodiment, when an FS device or an LS device is coupled to the circuit apparatus 10, the bus monitoring circuit 16 first turns off the bus switching circuit 14 and detects the port to which FS_J resulting from the DP pulling up or LS_J resulting from the DM pulling up is presented, the port of the bus on the side facing the bus BS1 or the port of the bus on the side facing the BS2. The bus monitoring circuit 16 then controls the pull-up control circuit 41 or the pull-up control circuit 42 at the port of the opposite bus to reflect the detected FS_J resulting from the DP pulling up or LS_J resulting from the DM pulling up and notifies the host of the coupling of the FS device or the LS device to achieve the idle state. Thereafter, an FS packet or an LS packet received from the host is transmitted to the device via the FS processing circuit 60, or an FS packet or an LS packet received from the device is transmitted to the host via the FS processing circuit 60. At the time of the packet transmission, the FS driver 33 or the FS driver 34 drives the USB bus to transmit the signal, whereby deterioration of the waveform can be avoided, so that the communication quality can be improved.

That is, the circuit apparatus 10 according to the present embodiment includes the physical layer circuits 11 and 12, the processing circuit 18, the bus switching circuit 14, and the bus monitoring circuit 16, as shown in FIGS. 1 and 3. The physical layer circuit 11 includes the FS receiver 31, the FS driver 33, and the pull-up control circuit 41. The physical layer circuit 12 includes the FS receiver 32 and the FS driver 34. When FS_J is detected on the bus BS2, the bus monitoring circuit 16 turns off the bus switching circuit 14, turns on the DP pulling up performed by the pull-up control circuit 41, and turns on the FS transfer process performed by the FS processing circuit 60. For example, the bus monitoring circuit 16 detects FS_J achieved by a device coupled to the bus BS2 at the timing t8 in FIG. 7. Specifically, the bus monitoring circuit 16 detects FS_J achieved by the device coupled to the bus BS2 based on the FS received signal RFS2, which is the result of the monitoring of the bus BS2 from the FS receiver 32 of the physical layer circuit 12 coupled to the bus BS2, as shown in FIG. 3. When FS_J is detected, the bus monitoring circuit 16 turns off at the timing t8a the coupling between the bus BS1 and the bus BS2 achieved by the bus switching circuit 14. Further, the bus monitoring circuit 16 uses the control signal RPU1 to turn on at the timing t8b the operation of pulling up the DP signal line of the bus BS1 performed by the pull-up control circuit

41. The bus monitoring circuit 16 then turns on the FS transfer process performed by the FS processing circuit 60 by setting the enable signal ENFS for the FS transfer at the high level, which is the active level, at the timing t9.

In the configuration described above, when FS_J on the bus BS2 is detected and device coupling is detected, the pull-up control circuit 41 pulls up the DP signal line of the bus BS1, whereby the host coupled to bus BS1 can be notified of the device coupling. Thereafter, when the bus switching circuit 14 is turned off and the FS transfer process is turned on, an FS packet can be transferred via the physical layer circuit 11, the processing circuit 18, and the physical layer circuit 12. Therefore, the signal carrying the FS packet is transferred not along the signal path passing through the bus switching circuit 14 but along the signal path passing through the physical layer circuit 11, the processing circuit 18, and the physical layer circuit 12, whereby the signal characteristics in the FS communication are improved, so that the FS eye pattern waveform in a certification test, for example, can be improved.

When the pull-up operation performed by the pull-up control circuit 41 is turned on and FS_K is then detected on the bus BS1 or the bus BS2, the bus monitoring circuit 16 turns on the FS transfer process. For example, when FS_J provided by the device coupled to the bus BS2 is detected at the timing t8 in FIG. 7 and FS_K is then detected at the timing t9, the bus monitoring circuit 16 sets the FS transfer enable signal ENFS at the high level to turn on the FS transfer process performed by the FS processing circuit 60. That is, the FS packet starts with FS_K and ends with SE0. Therefore, when FS_J is detected and FS_K is then detected, it is determined that the transmission of the FS packet has started, and the bus monitoring circuit 16 turns on the FS processing circuit 60. Therefore, when the pull-up operation performed by the pull-up control circuit 41 is turned on and FS_K is then detected, it is determined that the transmission of the FS packet has started, and the FS transfer process can be turned on.

When a USB cable is attached and FS_J is then detected on the bus BS2, the bus monitoring circuit 16 turns off the bus switching circuit 14 and turns on the DP pulling up performed by the pull-up control circuit 41. Thereafter, when SE0 is detected on the bus BS1, the bus monitoring circuit 16 turns on the bus switching circuit 14 and turns off the DP pulling up performed by the pull-up control circuit 41. For example, when a USB cable is attached at the timing t1 in FIG. 7 and FS_J is then detected at the timing t2, the bus monitoring circuit 16 turns off at the timing t2a the coupling between the bus BS1 and the bus BS2 achieved by the bus switching circuit 14. Further, the bus monitoring circuit 16 uses the control signal RPU1 to turn on at the timing t2b the operation of pulling up the DP signal line of the bus BS1 performed by the pull-up control circuit 41. When SE0 is detected at the subsequent timing t3, the bus monitoring circuit 16 turns on the coupling between the bus BS1 and the bus BS2 achieved by the bus switching circuit 14 and turns off the operation of pulling up the DP signal line of the bus BS1 performed by the pull-up control circuit 41. In the configuration described above, when the USB cable is attached and FS_J provided by the device coupled to the bus BS2 is then detected, the bus switching circuit 14 is turned off, preventing FS_J on the bus BS2 from being transmitted via the bus switching circuit 14 to the host coupled to the bus BS1. Thereafter, when the DP pulling up performed by the pull-up control circuit 41 is turned on, the circuit apparatus 10 notifies the host of the coupling of the device to the bus BS2. Thereafter, when SE0 is detected on the bus BS1, it is determined that the host has performed the bus reset, so that the bus switching circuit 14 is turned on and the DP pulling up performed by the pull-up control circuit 41 is turned off. The configuration described above allows, after the bus reset, transition to the HS detection handshake for HS communication, as shown in FIG. 5, or FS and LS communication, as shown in FIGS. 7 and 9.

When transition to the FS idle state is detected, the bus monitoring circuit 16 turns off the FS transfer process performed by the processing circuit 18 with the coupling between the bus BS1 and the bus BS2 achieved by the bus switching circuit 14 kept off and the pull-up operation performed by the pull-up control circuit 41 kept on. For example, when the FS communication is terminated and transition to the FS idle state is detected at the timing t10 in FIG. 8, the FS transfer enable signal changes from the high level to the low level, which is an inactive level, and the FS transfer process performed by the FS processing circuit 60 is turned off with the bus switching circuit 14 kept off and the DP pulling up performed by the pull-up control circuit 41 kept on. When the FS idle state longer than 3 ms is detected, the bus switching circuit 14 is turned on, and the DP pulling up performed by the pull-up control circuit 41 is turned off. Therefore, when transition to the FS idle is detected, the FS transfer process can be turned off with the bus switching circuit 14 kept off and the pull-up operation performed by the pull-up control circuit 41 kept on. Thereafter, when no FS communication is performed for a period longer than a predetermined period, the idle state is allowed to transition to the suspended state by turning on the bus switching circuit 14 and turning off the pull-up control circuit 41.

Further, in the present embodiment, the physical layer circuit 12 includes the pull-up control circuit 42, which performs the operation of pulling up the bus BS2, as shown in FIG. 3. When FS_J is detected on the bus BS1, the bus monitoring circuit 16 turns off the coupling between the bus BS1 and the bus BS2 achieved by the bus switching circuit 14, turns on the pull-up operation performed by the pull-up control circuit 42, and turns on the FS transfer process performed by the processing circuit 18. The pull-up control circuit 42 is a second pull-up control circuit and pulls up the DP and DM signal lines of the bus BS2. For example, the pull-up control circuit 42 includes a pull-up resistor having one end coupled to a high-potential power supply node and a pull-up switching circuit having one end coupled to the other end of pull-up resistor and the other end coupled to a USB signal line. When the pull-up switching circuit is turned on, the USB signal line, such as the DP signal line of the bus BS2, is pulled up.

Providing the pull-up control circuit 42 on the side facing the bus BS2 as described above allows handling of a coupling aspect in which a device is coupled to the bus BS1 and a host is coupled to the bus BS2. That is, when FS_J provided by the device coupled to the bus BS1 is detected, the bus monitoring circuit 16 turns off the coupling between the bus BS1 and the bus BS2 achieved by the bus switching circuit 14. The bus monitoring circuit 16 then turns on the pull-up operation performed by the pull-up control circuit 42 and turns on the FS transfer process performed by the processing circuit 18. When the pull-up control circuit 42 pulls up the bus BS2, the host coupled to the bus BS2 can be notified that a device has been coupled to the bus BS1. Thereafter, when the coupling between the bus BS1 and the bus BS2 is turned off and the FS transfer process is turned on, the FS transfer process of transferring an FS packet received from the bus BS1 to the bus BS2 and transferring an FS packet received from the bus BS2 to the bus BS1 can be performed. That is, an FS packet can be transferred from the host coupled to the bus BS2 to the FS device coupled to the bus BS1 and vice versa.

Further, in the present embodiment, when LS_J is detected on the bus BS2, the bus monitoring circuit 16 turns off the bus switching circuit 14, turns on the DM pulling up performed by the pull-up control circuit 41, and turns on the LS transfer process performed by the processing circuit 18. For example, the bus monitoring circuit 16 detects LS_J provided by an LS device coupled to the bus BS2 at the timing t8 in FIG. 9. Specifically, the bus monitoring circuit 16 detects LS_J provided by the device coupled to the bus BS2 based on the FS received signal RFS2, which is the result of the monitoring of the bus BS2 from the FS receiver 32 of the physical layer circuit 12 coupled to the bus BS2, as shown in FIG. 3. When LS_J is detected, the bus monitoring circuit 16 turn off at the timing t8a the coupling between the bus BS1 and the bus BS2 achieved by the bus switching circuit 14. Further, the bus monitoring circuit 16 uses the control signal RPU1 to turn on at the timing t8b the operation of pulling up the DM signal line of the bus BS1 performed by the pull-up control circuit 41. The bus monitoring circuit 16 then turns on the LS transfer process by setting the enable signal ENFS at the high level at the timing t9.

In the configuration described above, when LS_J on bus BS2 is detected and LS device coupling is detected, the pull-up control circuit 41 pulls up the DM signal line of the bus BS1, whereby the host coupled to bus BS1 can be notified of the LS device coupling. Thereafter, when the bus switching circuit 14 is turned off and the LS transfer process is turned on, an LS packet can be transferred via the physical layer circuit 11, the processing circuit 18, and the physical layer circuit 12. Therefore, a signal carrying the LS packet is transferred not along the signal path passing through the bus switching circuit 14 but along the signal path passing through the physical layer circuit 11, the processing circuit 18, and the physical layer circuit 12, whereby the signal characteristics in the LS communication are improved, so that the LS eye pattern waveform in a certification test, for example, can also be improved.

3. Variations

Variations of the present embodiment will next be described. For example, in the present embodiment, the FS processing circuit 60 is newly added to the processing circuit in addition to the HS processing circuit 50. The HS processing circuit 50 resynchronizes an HS packet received from the port of one of the buses based on the HS clock, adjusts the amplitude of the HS packet, and outputs the resultant HS packet to the port of the other bus. The thus configured present embodiment removes jitter superimposed by the USB cable and a variety of protective parts and amplifies the attenuated signal level to improve the communication quality of the HS communication.

On the other hand, in the FS communication or the LS communication, signal deterioration occurs as in the HS communication, but the transfer speed is slow, so that the influence of the superimposed jitter on the communication quality is relatively small. Therefore, in the present embodiment, the FS processing circuit 60 relays the FS communication or the LS communication by performing no resynchronization so that the jitter is not removed but only improving the amplitude to amplify the attenuated signal level. Instead, the resynchronization may be performed as in the HS communication.

Further, in the present embodiment, the signal path of the suspending/resuming signal during the FS coupling or the LS coupling is switched to the signal path passing through the bus switching circuit 14. Since the suspending/resuming signal is a DC-like signal by nature and the amplitude level of the signal is not an evaluation target in a certification test, it is believed that no practical problem occurs when the suspending/resuming signal passes through the bus switching circuit 14 as in the related art. However, when it is desired to improve the characteristics of the suspending/resuming signal as in the FS communication and the LS communication, the pull-up control circuit 41 may perform the pull-up operation, and the signal path may be changed to the signal path passing through the FS processing circuit 60. Instead, the signal path of the suspending/resuming signal may be selected from the signal path passing through the bus switching circuit 14 and the signal path passing through the FS processing circuit 60.

4. Electronic Instrument and Vehicle

Figure 11:
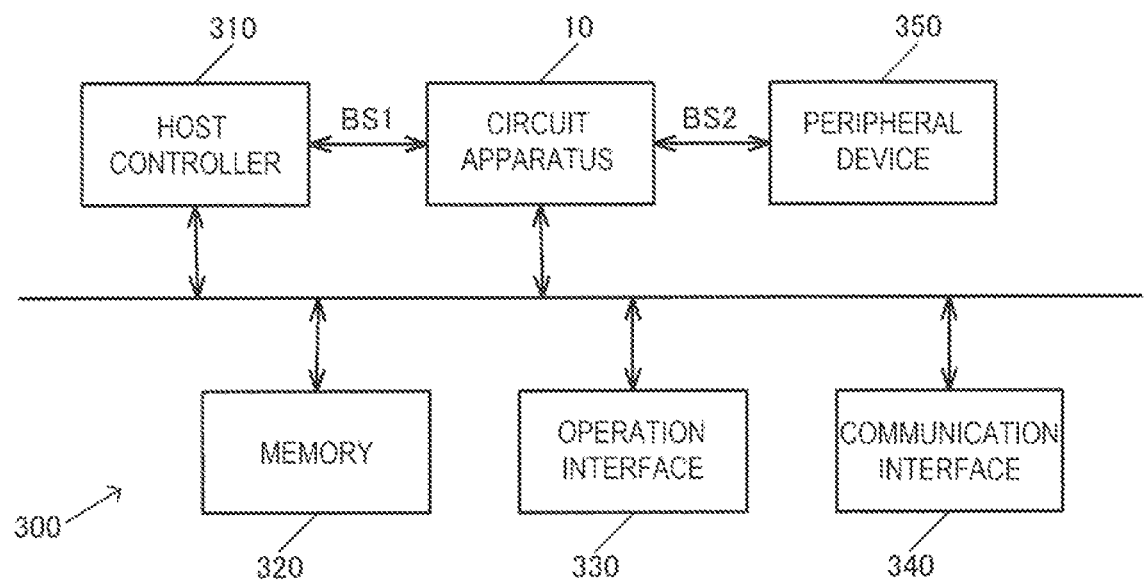
FIG. 11 shows an example of the configuration of an electronic instrument.

FIG. 11 shows an example of the configuration of an electronic instrument 300 including the circuit apparatus 10 according to the present embodiment. The electronic instrument 300 includes the circuit apparatus 10 according to the present embodiment. The circuit apparatus 10 is coupled to a host controller 310 via the bus BS1. The circuit apparatus 10 is also coupled to a peripheral device 350 via the bus BS2.

The host controller 310, which is a processing apparatus, is achieved by a processor, for example, a CPU or an MPU. The host controller 310 may instead be achieved by any of a variety of ASIC circuit apparatuses. The host controller 310 may still instead be achieved by a circuit substrate on which a plurality of circuit apparatuses and circuit parts are mounted. As the peripheral device 350, for example, a portable terminal apparatus can be assumed, but not limited thereto. The peripheral device 350 may, for example, be a wearable instrument.

The electronic instrument 300 can further include a memory 320, an operation interface 330, and a communication interface 340. The memory 320 stores, for example, data from the operation interface 330 and the communication interface 340 or functions as a work memory used by the circuit apparatus 10. The memory 320 can be achieved, for example, by a semiconductor memory, such as a RAM (random access memory) and a ROM (read only memory), or a magnetic storage apparatus, such as a hard disk drive. The operation interface 330 is a user interface that accepts a variety of types of operation from a user. For example, the operation interface 330 can be achieved, for example, by a variety of buttons, or a touch panel. The communication interface 340 is an interface for communication of a variety of data, such as control data and image data. The communication process performed by the communication interface 340 may be a wired communication process or a wireless communication process.

Specific examples of the electronic instrument 300 may include car navigation instruments, in-vehicle audio instruments, in-vehicle instruments, such as meter panels, projectors, head mounted displays, printing apparatuses, portable information terminals, portable game terminals, robots, and a variety of other electronic instruments, such as information processing apparatuses. The electronic instrument 300 may instead be a biological information measuring instrument, a measurement instrument that measures physical quantities, such as the distance, period, flow speed, or flow rate, a network-related instrument, such as a base station or a router, a content providing instrument that distributes contents, or a video instrument, such as a digital camera or a video camcorder. The electronic instrument 300 may still instead be a cable harness provided on a USB cable.

Figure 12:
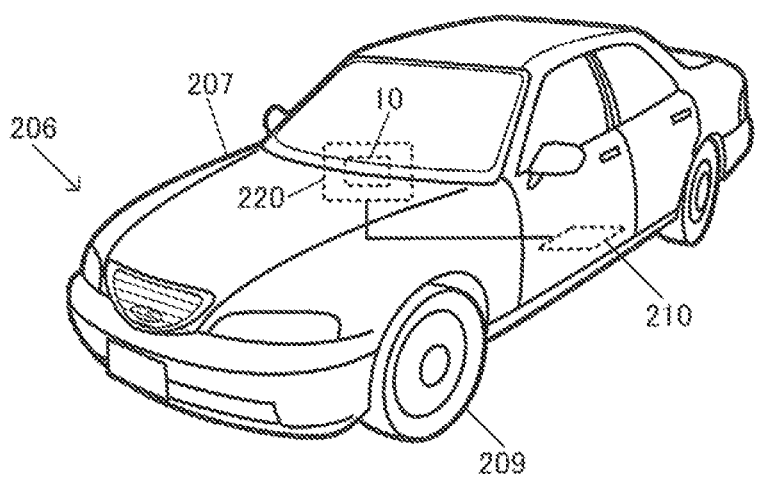
FIG. 12 is an example of the configuration of a vehicle.

FIG. 12 shows an example of the configuration of a vehicle including the circuit apparatus 10 according to the present embodiment. The vehicle is, for example, an instrument or an apparatus provided with a drive mechanism, such as an engine or a motor, a steering mechanism, such as a steering wheel or a rudder, and a variety of electronic instruments and travels on the ground, in the sky, or on the sea. As the vehicle according to the present embodiment, for example, a car, an airplane, a motorcycle, a ship, or a robot can be assumed. FIG. 12 schematically shows an automobile 206 as a specific example of the vehicle. The automobile 206 includes a vehicle body 207 and wheels 209. The automobile 206 incorporates an in-vehicle instrument 220 including the circuit apparatus 10 and a control apparatus 210, which controls each portion of the automobile 206. The control apparatus 210 can include, for example, an electronic control unit (ECU). The circuit apparatus 10 according to the present embodiment may be provided in the control apparatus 210. The in-vehicle device 220 is, for example, a car navigation instrument, an in-vehicle audio instrument, or a panel instrument, such as a meter panel.

As described above, the circuit apparatus according to the present embodiment includes a first physical layer circuit to which a first bus compliant with the USB standard is coupled, a second physical layer circuit to which a second bus compliant with the USB standard is coupled, and a processing circuit that performs an FS transfer process of transferring an FS packet received from the first bus via the first physical layer circuit to the second bus via the second physical layer circuit and transferring an FS packet received from the second bus via the second physical layer circuit to the first bus via the first physical layer circuit in the FS mode. The circuit apparatus further includes a bus monitoring circuit that monitors the first bus and the second bus and a bus switching circuit that turns on or off the coupling between the first bus and the second bus based on the result of the monitoring performed by the bus monitoring circuit. The first physical layer circuit includes a first FS receiver that is a receiving circuit that operates in the FS mode in the first bus, a first FS driver that is a transmitting circuit that operates in the FS mode in the first bus, and a first pull-up control circuit that pulls up the first bus. The second physical layer circuit includes a second FS receiver that is a receiving circuit that operates in the FS mode in the second bus and a second FS driver that is a transmitting circuit that operates in the FS mode in the second bus. When FS_J is detected on the second bus, the bus monitoring circuit turns off the coupling between the first bus and the second bus achieved by the bus switching circuit, turns on the pull-up operation performed by the first pull-up control circuit, and turns on the FS transfer process performed by the processing circuit.

According to the configuration described above, when FS_J is detected on the second bus and device coupling is detected, the first pull-up control circuit pulls the signal line of the first bus, whereby the host coupled to the first bus can be notified of the device coupling. Thereafter, when the coupling between the first bus and the second bus achieved by the bus switching circuit is turned off and the FS transfer process is turned on, an FS packet can be transferred via the first physical layer circuit, the processing circuit, and the second physical layer circuit, whereby the signal characteristics in the FS communication can be improved.

In the present embodiment, when the pull-up operation is turned on and then FS_K is detected on the first bus or the second bus, the bus monitoring circuit may turn on the FS transfer process performed by the processing circuit.

According to the configuration described above, when the pull-up operation performed by the first pull-up control circuit is turned on and then FS_K is detected, it is determined that transmission of an FS packet has started, and the FS transfer process can be turned on.

In the present embodiment, when a USB cable is attached and FS_J is then detected on the second bus, the bus monitoring circuit may turn off the coupling between the first bus and the second bus achieved by the bus switching circuit and turn on the pull-up operation performed by the first pull-up control circuit, and when SE0 is detected on the first bus, the bus monitoring circuit may turn on the coupling between the first bus and the second bus achieved by the bus switching circuit and turn off the pull-up operation performed by the first pull-up control circuit.

According to the configuration described above, when an USB cable is attached and FS_J is then detected on the second bus, the bus switching circuit is turned off, preventing FS_J on the second bus from being transmitted to the first bus via the bus switching circuit. Thereafter, when the pull-up operation performed by the first pull-up control circuit is turned on, the host is notified of the device coupling on the second bus. Thereafter, when SE0 is detected on the first bus, it is determined that the bus reset has been performed, so that the coupling between the first bus and the second bus achieved by the bus switching circuit is turned on, and the pull-up operation performed by the first pull-up control circuit is turned off, whereby a USB signal can be transmitted via the bus switching circuit.

In the present embodiment, when transition to the FS idle state is detected, the bus monitoring circuit may turn off the FS transfer process performed by the processing circuit with the coupling between the first bus and the second bus achieved by the bus switching circuit kept off and the pull-up operation kept on.

According to the configuration described above, when transition to the FS idle is detected, the FS transfer process can be turned off with the coupling between the first bus and the second bus achieved by the bus switching circuit kept off and the pull-up operation performed by the first pull-up control circuit 41 kept on.

In the present embodiment, the second physical layer circuit may include a second pull-up control circuit that pulls up the second bus, and when FS_J is detected on the first bus, the bus monitoring circuit may turn off the coupling between the first bus and the second bus achieved by the bus switching circuit, turn on the pull-up operation performed by the second pull-up control circuit, and turn on the FS transfer process performed by the processing circuit.

Providing the second pull-up control circuit on the side facing the second bus as described above allows handling of a coupling aspect in which a device is coupled to the first bus and a host is coupled to the second bus.

In the present embodiment, the processing circuit may include a first buffer circuit that buffers an FS received signal from the first FS receiver and outputs the buffered FS received signal as an FS transmitted signal to the second FS driver and a second buffer circuit that buffers an FS received signal from the second FS receiver and outputs the buffered FS received signal as the FS transmitted signal to the first FS driver.

An FS processing circuit formed as described above of the first and second buffer circuits can buffer an FS signal from the first bus and output the buffered FS signal to the second bus or buffer an FS signal from the second bus and output the buffered FS signal to the first bus.

In the present embodiment, the processing circuit may perform in the LS mode an LS transfer process of transferring an LS packet received from the first bus via the first physical layer circuit to the second bus via the second physical layer circuit and transferring an LS packet received from the second bus via the second physical layer circuit to the first bus via the first physical layer circuit. When LS_J is detected on the second bus, the bus monitoring circuit may turn off the coupling between the first bus and the second bus achieved by the bus switching circuit, turn on the pull-up operation performed by the first pull-up control circuit, and turn on the LS transfer process performed by the processing circuit.

According to the configuration described above, when LS_J is detected on second bus and device coupling is detected, the first pull-up control circuit pulls up the signal line of the first bus, whereby the host coupled to first bus can be notified of the device coupling. Thereafter, when the coupling between the first bus and the second bus achieved by the bus switching circuit is turned off and the LS transfer process is turned on, an LS packet can be transferred via the first physical layer circuit, the processing circuit, and the second physical layer circuit, whereby the signal characteristics in the LS communication can be improved.

The present embodiment also relates to an electronic instrument including the circuit apparatus described above.

The present embodiment also relates to a vehicle including the circuit apparatus described above.

The present embodiment has been described above in detail, and a person skilled in the art will readily appreciate that a large number of variations are conceivable to the extent that they do not substantially depart from the novel items and effects of the present disclosure. Such variations are all therefore assumed to fall within the scope of the present disclosure. For example, a term described at least once in the specification or the drawings along with a different term having a broader meaning or the same meaning can be replaced with the different term anywhere in the specification or the drawings. Further, all combinations of the present embodiment and the variations fall within the scope of the present disclosure. Moreover, the configuration, operation, and other factors of each of the circuit apparatus, the electronic instrument, and the vehicle are not limited to those described in the present embodiment and can be changed in a variety manners.

What is claimed is:

1. A circuit apparatus comprising:
   a first physical layer circuit to which a first bus compliant with a Universal Serial Bus (USB) standard is coupled;
   a second physical layer circuit to which a second bus compliant with the USB standard is coupled;
   a processing circuit that performs a Full Speed (FS) transfer process of transferring an FS packet received from the first bus via the first physical layer circuit to the second bus via the second physical layer circuit and transferring the FS packet received from the second bus via the second physical layer circuit to the first bus via the first physical layer circuit in an FS mode;
   a bus monitoring circuit that monitors the first bus and the second bus; and
   a bus switching circuit that turns on or off coupling between the first bus and the second bus based on a result of the monitoring performed by the bus monitoring circuit,
   wherein the first physical layer circuit includes
   a first FS receiver that is a receiving circuit that operates in the FS mode in the first bus,
   a first FS driver that is a transmitting circuit that operates in the FS mode in the first bus, and
   a first pull-up control circuit that pulls up the first bus,
   the second physical layer circuit includes
   a second FS receiver that is a receiving circuit that operates in the FS mode in the second bus, and
   a second FS driver that is a transmitting circuit that operates in the FS mode in the second bus, and
   when FS_J is detected on the second bus, the bus monitoring circuit turns off the coupling between the first bus and the second bus achieved by the bus switching circuit, turns on the pull-up operation performed by the first pull-up control circuit, and turns on the FS transfer process performed by the processing circuit.

2. The circuit apparatus according to claim 1, wherein when the pull-up operation is turned on and then FS_K is detected on the first bus or the second bus, the bus monitoring circuit turns on the FS transfer process performed by the processing circuit.

3. The circuit apparatus according to claim 1, wherein when a USB cable is attached and FS_J is then detected on the second bus, the bus monitoring circuit turns off the coupling between the first bus and the second bus achieved by the bus switching circuit and turns on the pull-up operation performed by the first pull-up control circuit, and when SE0 is detected on the first bus, the bus monitoring circuit turns on the coupling between the first bus and the second bus achieved by the bus switching circuit and turns off the pull-up operation performed by the first pull-up control circuit.

4. The circuit apparatus according to claim 1, wherein when transition to an FS idle state is detected, the bus monitoring circuit turns off the FS transfer process performed by the processing circuit with the coupling between the first bus and the second bus achieved by the bus switching circuit kept off and the pull-up operation kept on.

5. The circuit apparatus according to claim 1,
   wherein the second physical layer circuit includes a second pull-up control circuit that pulls up the second bus, and
   when FS_J is detected on the first bus, the bus monitoring circuit turns off the coupling between the first bus and the second bus achieved by the bus switching circuit, turns on the pull-up operation performed by the second pull-up control circuit, and turns on the FS transfer process performed by the processing circuit.

6. The circuit apparatus according to claim 1,
   wherein the processing circuit includes
   a first buffer circuit that buffers an FS received signal from the first FS receiver and outputs the buffered FS received signal as an FS transmitted signal to the second FS driver, and
   a second buffer circuit that buffers an FS received signal from the second FS receiver and outputs the buffered FS received signal as the FS transmitted signal to the first FS driver.

7. The circuit apparatus according to claim 1,
   wherein the processing circuit performs in a Low Speed (LS) mode an LS transfer process of transferring an LS packet received from the first bus via the first physical layer circuit to the second bus via the second physical layer circuit and transferring the LS packet received from the second bus via the second physical layer circuit to the first bus via the first physical layer circuit, and when LS_J is detected on the second bus, the bus monitoring circuit turns off the coupling between the first bus and the second bus achieved by the bus switching circuit, turns on the pull-up operation performed by the first pull-up control circuit, and turns on the LS transfer process performed by the processing circuit.

8. An electronic instrument comprising the circuit apparatus according to claim 1.

9. A vehicle comprising the circuit apparatus according to claim 1.

* * * * *